Nov. 16, 1965 W. H. BLASHFIELD 3,218,392

SIGNALLING SYSTEM FOR USE WITH TOLL TICKETING EQUIPMENT

Filed Oct. 10, 1961 5 Sheets-Sheet 1

INVENTOR.
WILLIAM H. BLASHFIELD
BY Brown, Jackson, Boettcher & Dienner

Nov. 16, 1965 W. H. BLASHFIELD 3,218,392

SIGNALLING SYSTEM FOR USE WITH TOLL TICKETING EQUIPMENT

Filed Oct. 10, 1961 5 Sheets-Sheet 2

INVENTOR.
WILLIAM H. BLASHFIELD

BY Brown, Jackson, Boettcher & Dienner

SIGNALLING SYSTEM FOR USE WITH TOLL TICKETING EQUIPMENT

Filed Oct. 10, 1961 5 Sheets-Sheet 3

INVENTOR.
WILLIAM H. BLASHFIELD
BY Brown, Jackson, Boettcher & Dienner

INVENTOR.
WILLIAM H. BLASHFIELD

BY Brown, Jackson, Boettcher & Dienner

SIGNALLING SYSTEM FOR USE WITH TOLL TICKETING EQUIPMENT

Filed Oct. 10, 1961

*INVENTOR.*
WILLIAM H. BLASHFIELD
*BY* Baum Jackson Balthus Dunn

United States Patent Office 3,218,392
Patented Nov. 16, 1965

3,218,392
SIGNALLING SYSTEM FOR USE WITH TOLL TICKETING EQUIPMENT

William H. Blashfield, Galion, Ohio, assignor to North Electric Company, Galion, Ohio, a corporation of Ohio
Filed Oct. 10, 1961, Ser. No. 144,151
34 Claims. (Cl. 179—7.1)

Figure 1:
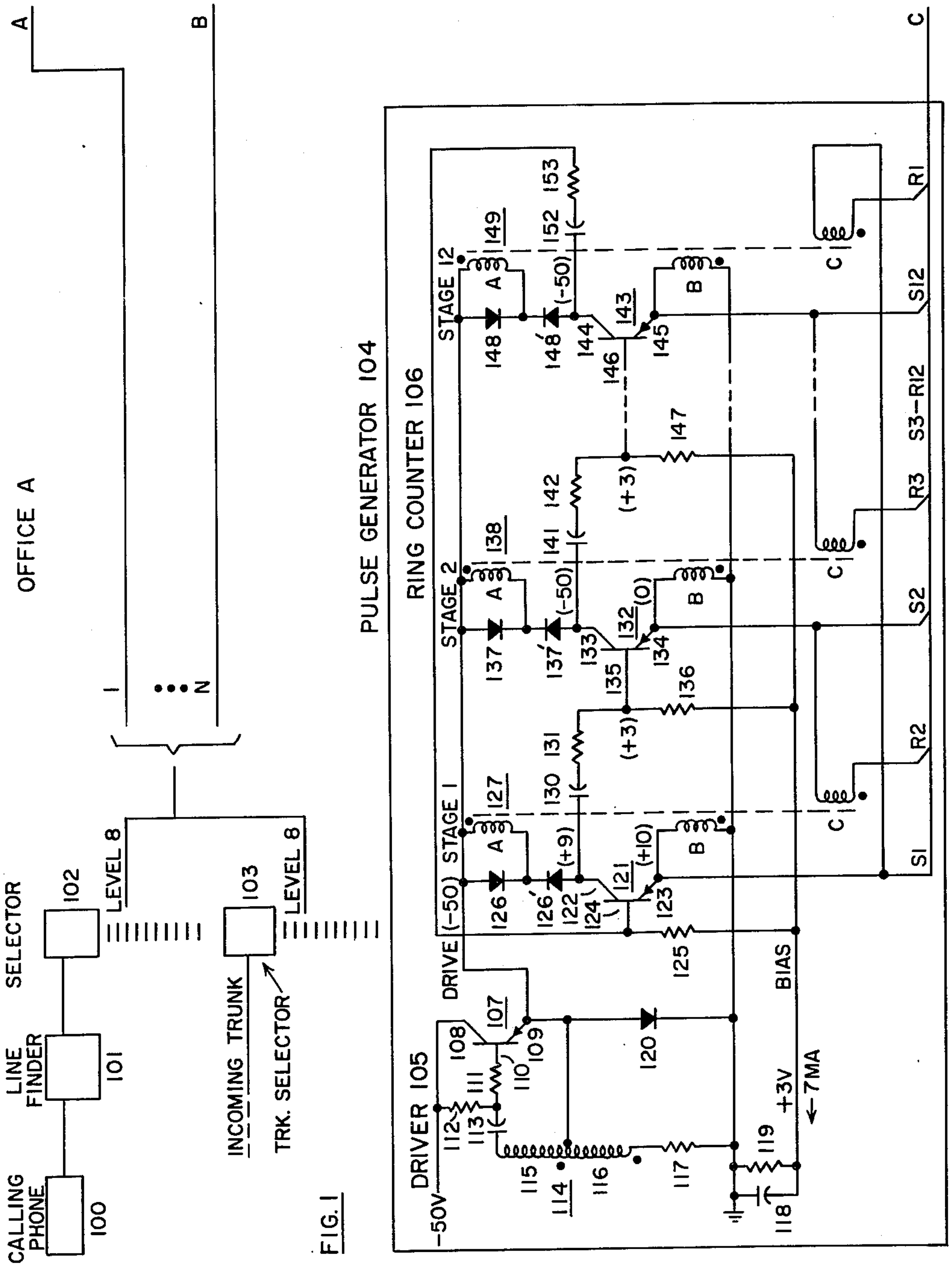

The present invention relates to an automatic telephone system including novel toll ticketing equipment for use in direct distance dialling installations, and more specifically to a novel signalling arrangement for use with toll ticketing equipment in establishing special forms of direct distance dialling calls.

In recent years there has been an increased use of equipment in automatic telephone systems which automatically gathers, stores, and processes information including information which pertains to certain types of direct distance calls. In most known embodiments of such systems the subscriber dials seven or ten digits, and the system automatically completes the call over toll equipment (including toll trunks) on a station-to-station "sent paid" basis, and automatically bills the call to the calling subscriber.

Such type equipment has resulted in substantially improved service for the subscriber, and has solved certain problems for the exchange operator. It has now been determined that a further improvement in service may be obtained by providing equipment for use with a direct distance dialing arrangement in which additional types of calls may also be made by the subscriber, and particularly in which person-to-person calls and collect calls may be made and completed in response to a dialing operation of the calling subscriber. It is an object of the present invention to provide a system which includes novel equipment which is operative in such manner.

In the novel system of the invention "station-to-station, sent-paid" calls are transmitted over the toll recording trunk without intervention by a toll operator as in known systems. In the extension of the special calls noted above, however, the operator is engaged only briefly, as contrasted with the longer periods now required in most known systems. In the extension of a person-to-person call, sent-paid, in the present system, for example, the operator is only required to ascertain verbally whether or not the called party is available. On a collect call, the operator need only ascertain verbally whether or not the called party is willing to accept the charges for the call.

Other types of special calls which may require the brief services of an operator include calls in which the bill is to be charged to a third number in the same rate area, calls which are initiated to second called numbers, calls in which repeated attempts are required by reason of the congested or busy conditions, paystation and credit card calls on a memo ticket basis, and others. In each instance, however, the operator is required for only a brief interval, and is not required to supervise the conversation period as in most systems now known in the field.

The structure for effecting the proper identification and handling of these different types of toll calls in the system, constitutes a novel feature of the invention. As disclosed more fully hereinafter, means in the toll recording trunk are connected to notify the operator by energizing appropriate indicator lamps at the toll board as the need for an operator occurs. The operator then answers the call by operating the cord circuit at her position (which may be the conventional plug and jack or key type cord circuit). The novel signalling means then provides detailed information over the plug and jack (or circuit completion means) of the cord circuit to the operator as to the status of the call to be worked. In response to such signals, the operator uses the novel signalling means to transmit a class indication digit over the plug and jack of the cord circuit to the toll recording trunk, and additionally a signal which starts the timing in the toll recording trunk. In certain of these calls, the operator also uses the plug and jack of the cord circuit and the novel signalling means to delete various information in the toll recording trunk, or alternatively to insert information in the toll recording trunk. Thereafter, the operator may disconnect from the connection, and the details of the call are automatically recorded.

Such arrangement obviously requires new and novel signalling means which are capable of effecting the transmission of many forms of information between a toll recording trunk and the operator's positions at the toll board in an automatic telephone system. In the interest of cost and convenience, such signalling is preferably effected over existing equipment, and it is a further object of the invention to provide a signal system which is so operative.

In most existing exchanges, the toll trunk and operators' positions are interconnected by a tip and ring conductor, a sleeve conductor, a call lamp conductor and a busy lamp conductor. Initial consideration suggests that such signalling might be readily accomplished over the tip and ring connections, which extend between the toll board and the operating position in most existing exchanges. However, such signalling would interfere with speech unless frequency signalling arrangements including expensive filter units were provided. In most exchanges, such equipment is prohibitive from a cost standpoint.

Signalling over the call lamp lead L or busy lamp lead BY is also impractical in that such leads cannot be selectively engaged at the toll board in most existing installations. On the other hand, the sleeve lead S, which is selectively engageable by means of a plug and jack has (1) relay means connected thereto in the toll recording trunk, and (2) supervisory lamp means connected thereto in the cord circuit, both of which are selectively operated by direct current signals which are coupled thereto, and any signalling arrangement over the S-lead must be compatible therewith.

According to a feature of the novel signalling means of the present invention, control and information signals are extended between a toll trunk and a toll board over existing connections in an automatic telephone exchange, and more specifically over the sleeve conductor which extends between the toll recording trunk and the toll board for the purpose of transmitting supervisory direct current signals therebetween.

As shown hereinafter, the novel system is based upon a novel means for effecting square wave coincidence gating which is isolated from the sleeve wire direct current circuits by condensers, and which uses frequencies in the order of kilocycles, whereby the pulse width is in the order of tens of microseconds.

The novel system of coincidence gating basically includes a novel pulse generator which is common to the system and which is operative to supply operating pulses S and reference pulses R in a cyclic manner, each cycle being referred to as a frame which is divided into time slots. Selective means are provided in the toll recording trunks for connecting operating pulses from the source pulse generator over the sleeve conductor to the toll board, and selective means are provided in the toll board for connecting operating pulses from the pulse generator over the sleeve conductor to the toll recording trunks. Novel pulse responsive means (designated as receivers hereinafter) are located in the toll recording trunks and in the toll board, and each receiver is connected for reference by a different reference pulse in a frame. Stated in another manner, each receiver is assigned a different time slot in a frame. Each receiver further includes novel gate means which operate only in response to receipt of an operating pulse from a transmitter means and a reference pulse from the pulse generator coincident with the operating pulse, both being received in the time slot assigned to the receiver. Different control means are connected to different receivers to provide a different control function, such as switching or indicating functions.

Figure 3:
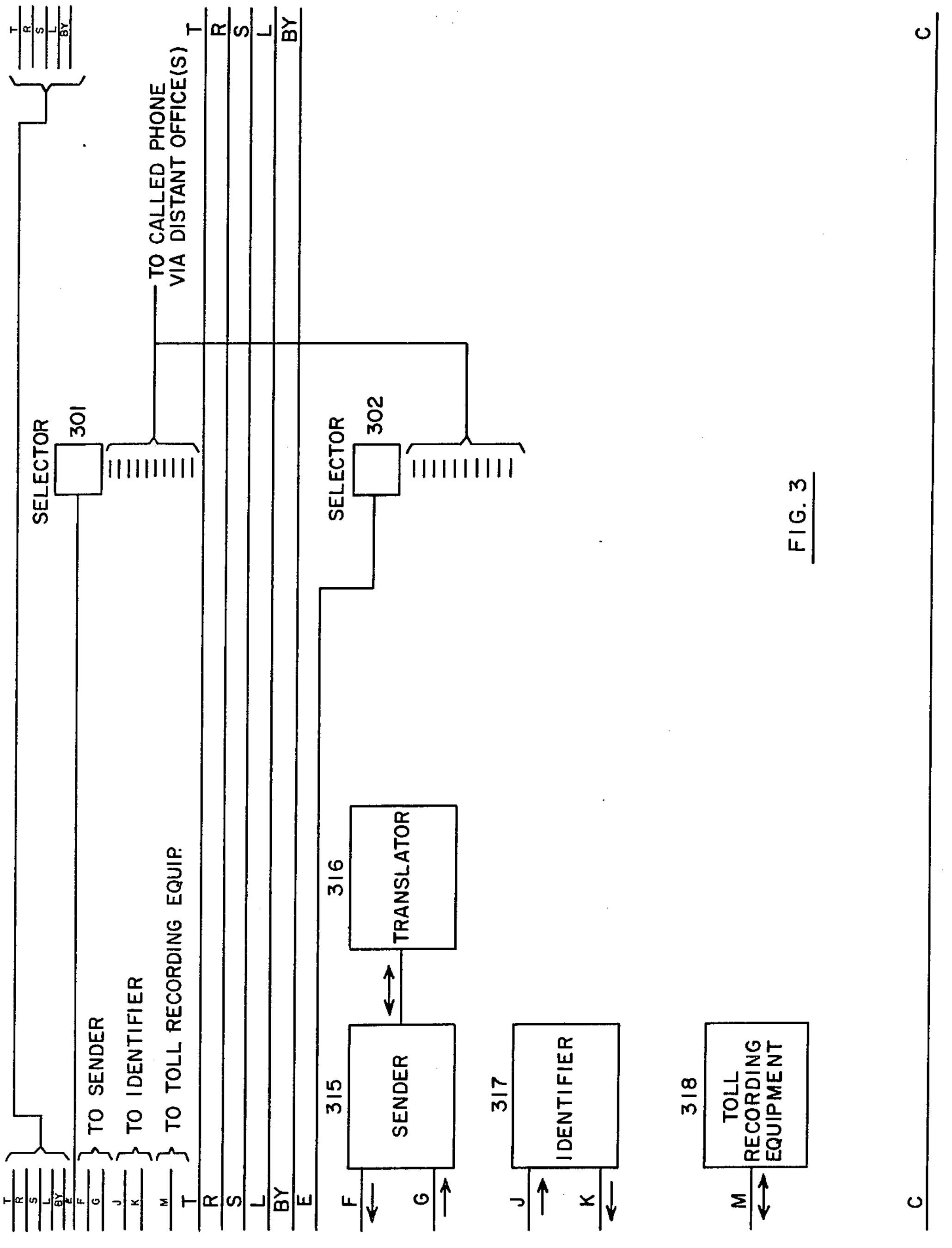
Figure 4:
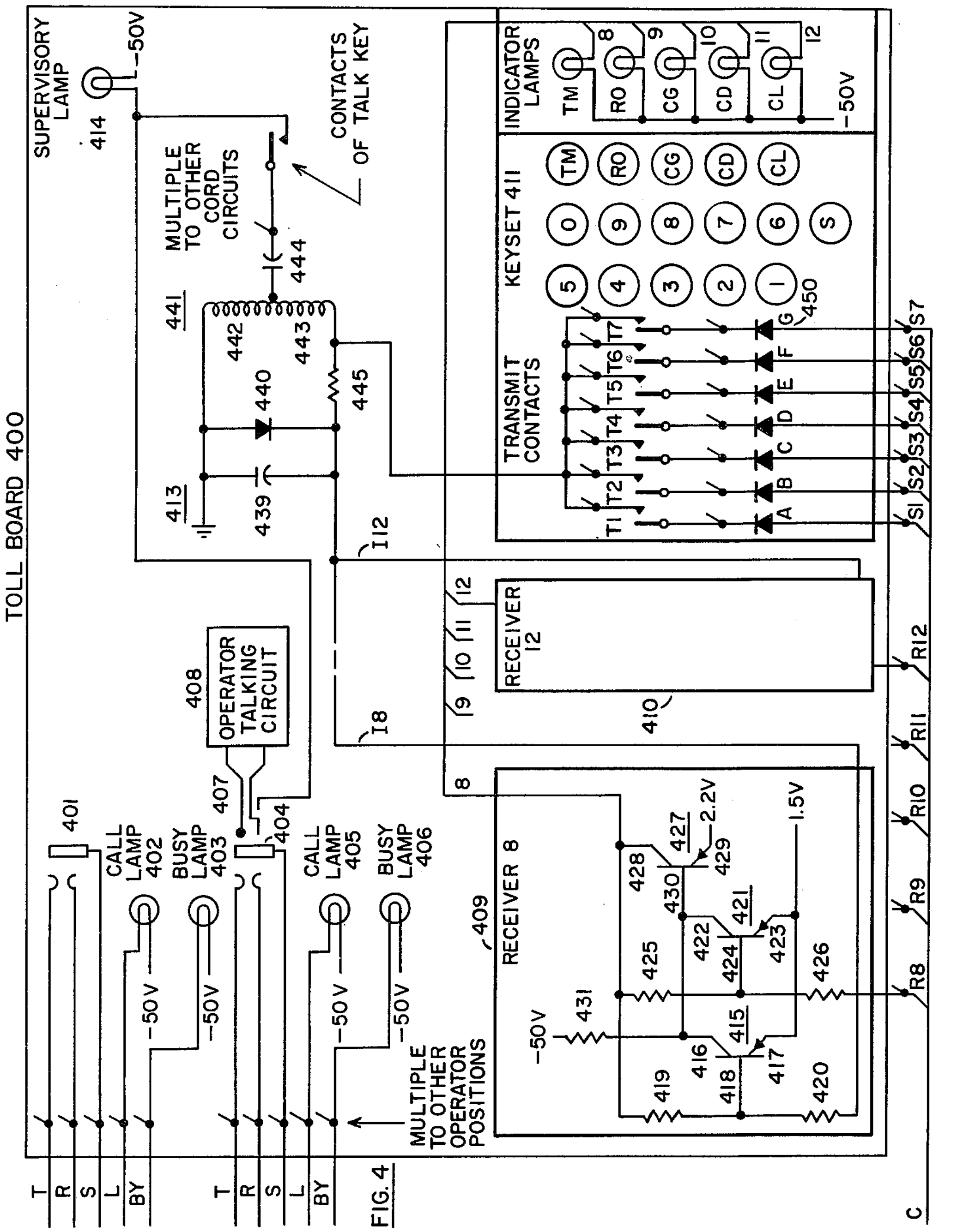
Figure 5:
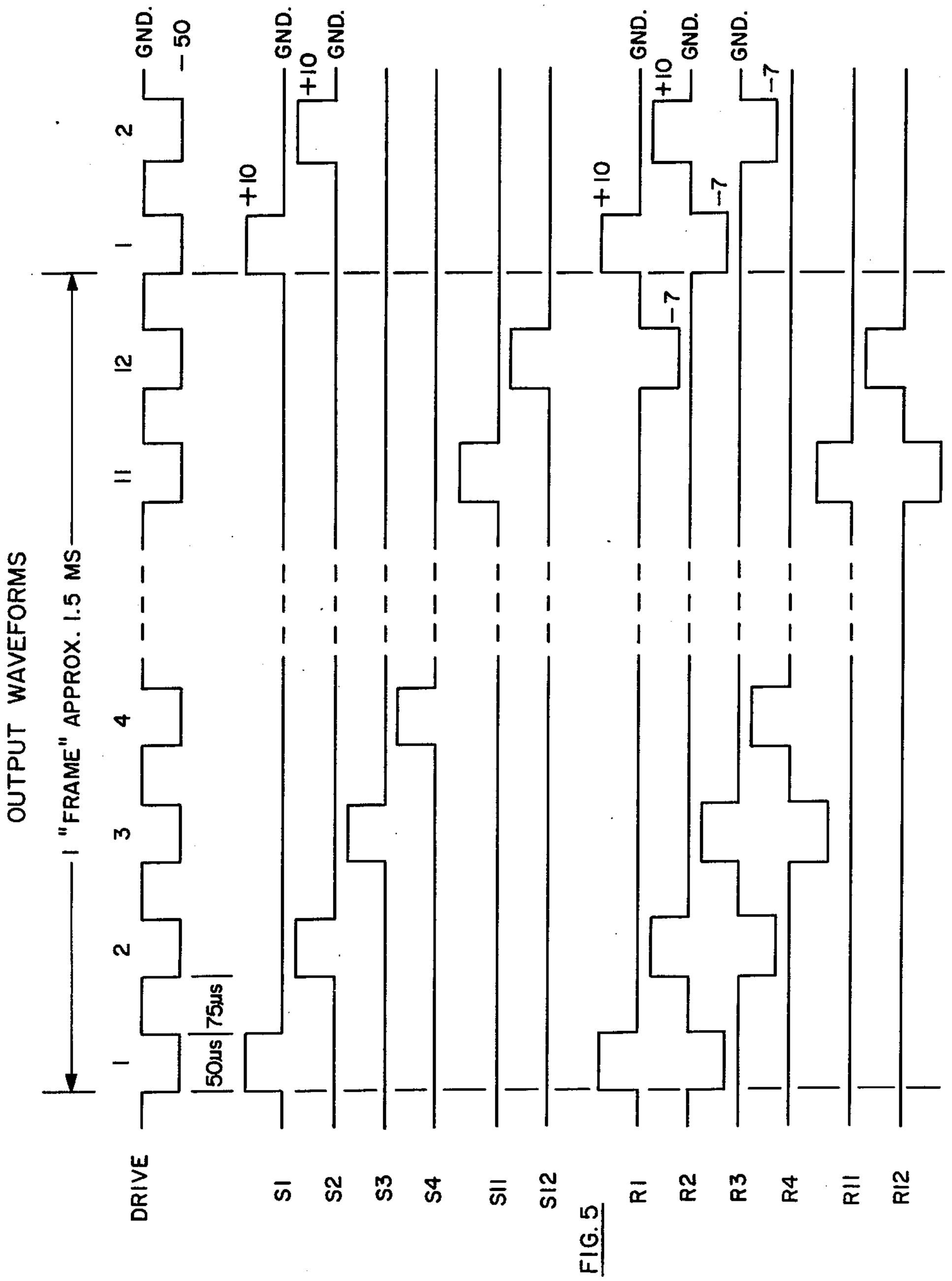

These and other advantages of the persent invention will become apparent with reference to the following specification and accompanying drawings wherein basic embodiments of the structure are illustrated, and in which:

FIGURES 1–4 arranged from left to right comprise an illustration of an automatic telephone system including the novel signalling system as connected between a toll trunk and toll board; and FIGURE 5 illustrates the signal output which is provided by the system pulse generator for use in the novel signalling system.

*General description*

An automatic telephone system including toll ticketing equipment having the novel signalling system of the invention is set forth in FIGURES 1–4 of the drawings. Portions of the automatic exchange which are known in the art are shown in block for the purpose of more clearly defining the specific invention of the present disclosure.

With reference to the drawings, FIGURE 1 includes a telephone office A having subscriber substations, such as substation 100, and automatic switching equipment including line finder 101, selector 102 having certain levels for extending calls to other subscribers in the office, and other levels, such as level 8 for extending calls over toll recording trunks, such as 1 . . . N, to remote offices. Toll ticketing equipment associated with the toll recording trunks 1 . . . N automatically record the details of such calls.

As shown in FIGURE 1, office A may also include incoming trunks 103 having connection to other offices (not shown) to permit use by the other offices of the toll ticketing equipment associated with office A, whereby a single set of toll ticketing equipment may serve a plurality of offices.

Toll recording trunk 202 which is the "N" trunk of a group of toll trunks (FIGURE 2) includes means for extending calls over path E to selector switches, such as illustrated selector switch 302, and over further conductor means including tip and ring conductors T, R, sleeve conductor S, lamp conductor L and busy conductor BY for establishing connection with the operators positions at an associated toll board 400 (FIGURE 4), in response to the establishment of certain special types of calls. Sender-translator equipment 315, 316, identifier 317 and toll recording equipment 318 are accessible to the toll recording trunks 1–N, and are operative in a well known manner to assist in the establishment of the connections to the distant offices, and to provide a record of the information pertaining to the call which is necessary for billing purposes.

Toll board 400 includes a plurality of operators positions in the manner of known offices, each of which has an operator talking circuit, such as 408, jack 403 for each toll recording trunk, and a plug 407 for selectively connecting the talking circuit and sleeve over the jack to the tip, ring and sleeve conductors for the different toll recording trunks, and a call lamp, such as 405, and a busy lamp, such as 406 for each trunk.

In addition to the conventional equipment set forth above, a novel signalling equipment is provided in the toll recording trunks 1–N and the toll board 400 for the purpose of extending information therebetween. Such equipment basically includes a pulse generator 104 (FIGURE 1) connected common to the system which is operative to provide operating pulses S and reference pulses R for use by transmit contacts T1–T12 and receiver equipment 1–12 in effecting the desired signalling between the trunks 1 . . . N and the toll board 400. As shown in more detail hereinafter, receiver units 1–7 are located in each toll recording trunk, such as 202. A key set 411 and associated transmit contacts T1–T7 at the toll board transmit signals over the interconnecting sleeve wire S to the selected trunk and the receiver units 1–7 thereat. Transmit contacts T8–T12 in the toll recording trunk which is being served by the operator transmit signals from the pulse generator 104 over the same sleeve conductor to receivers 8–12 located at the toll board 400. Each receiver 1–12 is also connected to pulse generator 104 over conductors R1–R12 and reference pulses R are cyclically coupled over conductors R1–R12 to the different receivers at different time periods in each cycle. Gate means in the receivers including transistors, such as 208, 214 and 219 in receiver 1, compare the reference and operating pulses R and S, and effect a control operation whenever the R and S pulses are coincident in a predetermined time slot in the cycle.

*Description of system operation in the establishment of calls thereover*

Preliminary to a detailed description of the manner in which the novel signalling circuit is operative to provide signalling control between the toll recording trunks 1–N and the toll board 400, a brief description is set forth hereat for the purpose of indicating the nature of the calls which are extended over the system, and the extent of operator assistance which is required in certain of the calls. The manner in which the novel signalling means are operated is indicated generally in such description, and the specific details of such equipment are set forth thereafter.

*Station-to-station, sent-paid call through system*

It is initially assumed for purposes of illustration that the party at calling substation 100 (FIGURE 1) in office A wishes to make a station-to-station, sent-paid call to a party in a remote office, indicated generally in FIGURE 3. In establishing such connection, the calling party removes the receiver from the substation, whereupon linefinder 101 extends a connection from substation 100 to selector switch 102. The calling party now dials a direct distance dialing digit 8, a party-identification digit 2, and the 2–5 number of the desired party. If necessary, a three-digit area code is also dialed prior to the dialing of the called subscriber number.

*Direct distance dialing digit "8"*

Figure 2:
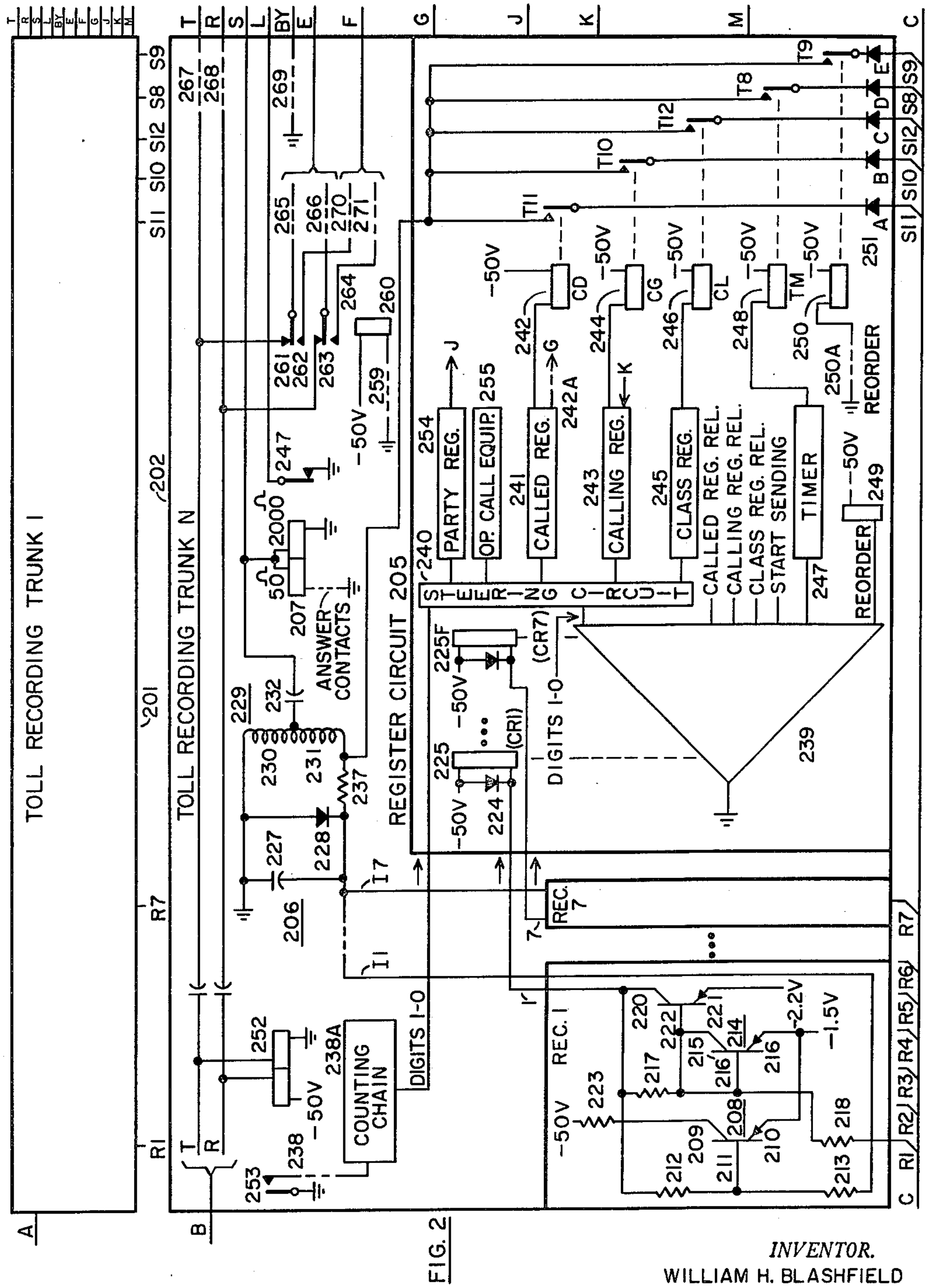

The direct distance dialing access code in the present system is "8," and as dial tone is returned by selector switch 102, the calling party dials the direct distance dialing access code 8 to control the selector switch 102 to advance to level 8, and to select an idle one of a group of toll recording trunks 1–N which are connected to level 8. Assuming that the "N" toll recording trunk designated 202 in FIGURE 2, is selected, line relay 225 in toll recording trunk 202 operates and initiates trunk operation in accordance with known practices. In such operation, contacts 269 are closed to connect ground to busy conductor BY which extends to the operators positions at toll board 400 (FIGURE 4), and effects lighting of the busy lamp, such as 406, at all operators' positions to notify the operators at the board that trunk 202 cannot be used at this time to complete such calls as are to be originated at the toll board.

*Party identification digit "2"*

As calling party now dials the assigned party identification digit "2," for example, the line relay 252 operates in response thereto, and at contacts 253 operates counting chain 238A to advance in the count of the incoming digit. As the digit is completely received, steering circuit 240 effects storage of the digit received by chain 238A in party register 254 in accordance with known techniques.

*Called number comprising 7 or 10 digits*

The calling party next dials the 7 or 10 digit conventional direct distance dialing (DDD) called number, and line relay 252 drives counting chain 238A in the determination of the value of each digit as received, and steering circuit 240 effects registration of each of the received digits in the called number register 241.

*Calling identification*

As soon as the party digit is registered in the party register 254, the toll trunk 202 is operative over conductor J to seize the common line identifier 317. Assuming a terminal per station arrangement, the party digit is used by the identifier 317 to translate the line number into a station number which is transmitted over conductor K to the register 205 for storage in the calling number register 243.

*Sender and translator functions*

After the seventh digit (or tenth digit if the area code precedes the seven digit number) of the called number has been received, the circuitry in trunk 202 effects opening of contacts 238, and with register circuit 205 effects seizure of a sender 315 (FIGURE 3) which seizes the translator 316. The sender 315 scans the area code (if present), and the called office code stored in the called number registers 241 (FIGURE 2), and stores such information in the translator 316 (FIGURE 3). The translator 316 marks the called number registers 241 as to the portion of the called number which is to be outpulsed in order to complete the call, and adds any required routing digits, the routing digits being stored in registers located in the sender 315. The translator 316 is then released.

Trunk relay 260 (FIGURE 2) now operates, and at its contacts 262, 264 connects the sender 315 over path or cable E to selector switch 302 (FIGURE 3). Sender 315 outpulses the digits stored in the sender routing registers, and that portion of the called number which is stored in called registors 241 required to complete the call. Relay 260 then restores, and at its contacts 262, 264 releases sender 315, and at contacts 261, 263 recompletes the connection from the calling substation over cable E to selector switch 302, and the connection extended to the desired party by the sender 315.

When the call is answered by the called party, day-night and class of call indications are automatically entered in their respective registers (not shown) in the register circuit 205, and conversation timing means is engaged automatically to step the toll recording trunk minute counter (not shown) for the duration of the conversation, such techniques and equipment being well known in the art.

*Toll recording functions*

When the subscribers have completed their conversation and restore the handsets to the substations, the connection between the calling and called parties is released, but the toll ticketing trunk 202 automatically engages toll recording equipment 318 and maintains a busy indication on busy conductor BY which extends to the operative position on toll board 400. Thereupon, information stored in the register circuit 205 is transmitted to the toll recording equipment 318, and is recorded on a paper tape in a five hole code along with certain calendar information obtained from the toll recording equipment 318. Information punches on the tape consist of calling telephone number, called telephone number (including area code when used), date, time of day, class of call, and duration of conversation as well as the recorder number and day-night indication. Tape scanning and computing equipment is thereafter used to produce a toll ticket, or alternatively, a toll ticket may be directly produced by toll recording equipment 318.

Subsequent to transmission of the pertinent information from the toll recording trunk 202 to the toll recording equipment 318, the toll recording equipment 318 releases the toll recording trunk 202 for use in the establishment of a further connection. Since the incoming call was a station-to-station, "sent paid" call, the equipment automatically marked the call as "class 1" in register circuit 205, and the trunk circuit 202 did not engage an operator for use in the extension thereof.

*Person-to-person call sent-paid through system*

It is now assumed that the same calling party makes a person-to-person, send-paid call to the same called party. As in the call described above, the calling party removes the handset from the substation, and line-finder 101 extends a connection from substation 100 to selector switch 102. Dial tone is returned to the calling subscriber by the selector switch 102, and the calling party now dials the direct distance dialing digit "8," the party identification digit 2, the operators assist code 1, and the called number preceded by an area code, if required.

*Direct distance dialing digit "8"*

As digit "8" is dialed, the selector switch 102 advances to level 8 and selects an idle toll recording trunk, such as 202. Trunk line relay 252 operates and the trunk circuitry controlled thereby closes contacts 269 to light the associated busy lamp, such as 406, at each of the operators positions at the toll board 400.

*Party identification digit "2"*

As the party identification digit "2" is received by line relay 252, counting chain 238A advances to count the value of the digit and the steering circuit 240 effects transfer of the digit to the party register 254 in register circuit 205 for storage therein.

*Calling line identification*

As before, as soon as the party digit "2" has been stored, the common line identifier 317 is engaged by the trunk 202 over cable J and assuming terminal per station operation, the party digit is used by the identifier 317 to translate the line number into a station number which is transmitted to and stored in the calling number registers 243.

*Operator assist code "1"*

In order to gain access to the operator for assistance, the calling party next dials the digit "1," which is registered in operator calling equipment 255 in the register circuit 205 which marks the toll recording trunk 202 to indicate that it is necessary for the operator to assist in the completion of the call. (Optionally a different digit, such as digit "0," could be used for this purpose, if desired.)

*Called number comprising 7 or 10 digits*

As in the call described above, the calling party dials the seven or ten digits DDD called number into the register circuit 205, where it is stored in called number registers.

*Engagement of operator*

After the complete called number is stored in the called register 241 in register circuit 205, the trunk circuitry effects opening of contacts 238, and the closure of contacts 267, 268 to extend the connection from the trunk 202 to the toll board 400 over the tip and ring conductors T and R.

Additionally, contacts 269 are closed, and ground is extended over contacts 247 and over lead L to call lamp 405 (FIGURE 4) and —50 volt battery to complete an energizing circuit for the call lamp 405 associated with toll recording trunk 202 at each of the operators positions at toll board 400, the illustrated multiples being connected to the other call lamps at other operators positions (not shown).

Assuming that the operator at one of the positions answers the call by inserting the plug 407 of a cord circuit into jack 404, information is automatically transmitted from the trunk 202 to such position by the novel signalling means as described more fully hereinafter. A talking circuit is completed from the operator's talking circuit 408 over tip and ring conductors T and R to the calling party substation 100 (FIGURE 1). Further, supervisory lamp 414 lights in series with relay 207 over a path which extends from −50 volt battery over lamp 414, the sleeve connections of plug 407 and jack 404, sleeve conductor S, and the 50 ohm low impedance winding of relay 207 (FIGURE 2) and answer contacts to ground. Information relative to the call in progress is now automatically transmitted to the toll board 400 by the novel signal arrangement of the disclosure in a manner more fully described hereinafter.

Relay 207 operates, and at its contacts 247 interrupts the energizing circuit for the call lamp 405. At this time circuitry in trunk circuit 202 transmits a tone indication over the tip and ring conductors T and R, or alternatively, the operator asks the calling party for information relative to the call being extended by the subscriber. In the present call (which is a person-to-person, sent-paid call), the calling party informs the operator that the call is being made person-to-person, sent-paid to John Doe. No other information is required by the operator. As described in more detail hereinafter, the operator now further utilizes the novel signalling equipment of the invention to transmit information relating to the call to the toll trunk 202.

*Sender and translator functions*

In that the calling party dialed the operator assist code "1" into register circuit 205, the toll recording trunk 202 is marked by such code, and the equipment is adjusted so that the following two conditions must be met before a sender-translator, such as 315, 316, is engaged: (1) the called number must be completely dialed, and (2) relay 207 must be operated as a result of the operator being engaged. With these conditions met, the toll recording trunk 202 seizes sender 315 which seizes the translator 316. As before, relay 260 operates to close contacts 262, 264, whereby the sender 315 may route the call over cable F to cable E and selector switch 302. As the sender 315 completes the pulse transmission, relay 260 restores and the sender 315 is released, and the calling subscriber 100 is connected over contacts 261, 263 to selector switch 302.

When the call is answered, day-night indication is automatically entered in register circuit 205 but because of the marking of the trunk by the operator assist code "1," the class of call indication is not automatically entered in register circuit 205, and conversation timing is not automatically begun. However, upon answer by the called party, the answer contacts (FIGURE 2) are opened in accordance with conventional techniques to disconnect ground from the 50 ohm winding of relay 207 and the sleeve conductor S. As a result of such operation, the circuit of supervisory lamp 414 (FIGURE 4) now extends over the 2000 ohm, high-resistance winding of relay 207, and relay 207 is held operated, but supervisory lamp 414 is extinguished as an indication to the operator that the called party has answered.

*Signalling over the sleeve between the toll recording trunk and the toll board*

As noted above, as soon as the operator inserted the plug 407 into the jack 404, extending sleeve connections from toll recording trunk 202 to the operator's position by means of the cord circuit shown, information was automatically transferred by the novel signalling circuit from the trunk circuit 202 to the toll board 400, and thereafter the operator transmits signals from the toll board 400 to the register circuit 205 over the same signalling circuit.

At this time, brief reference is made to the components utilized by the trunk and the operator in extending the information representative signals from register circuit 205 to the toll board 400. Basically such components include the pulse generator 104, transmit contacts T8–T12 and sleeve coupling circuit 206 in register circuit 205 (FIGURE 2), the sleeve conductor S, receivers 8–12 in toll board 400 (FIGURE 4) and indicator lamps 8–12 (FIGURE 4). The following chart sets forth the relationship between such members.

| Transmit Contacts in Register 205 | Receivers on Toll Board | Lamps |
|---|---|---|
| T8 operates | 8 which energizes | TM (Time start). |
| T9 operates | 9 which energizes | RO (Reorder). |
| T10 operates | 10 which energizes | CG (Calling Number Register Delete Key). |
| T11 operates | 11 which energizes | CD (Called Number Register Delete Key). |
| T12 operates | 12 which energizes | CL (Class Number Register Delete Key). |

The basic components used in transmitting signals from the toll board 400 to the trunks, such as 202, include the

| Key in Keyset 411 | Transmit Contacts | Receivers | Effect in Circuit 205 |
|---|---|---|---|
| 1 operates | T3 and T4 which operate | 3 and 4 to effect | Registration of Digit 1. |
| 2 operates | T3 and T5 which operate | 3 and 5 to effect | Registration of Digit 2. |
| 3 operates | T4 and T5 which operate | 4 and 5 to effect | Registration of Digit 3. |
| 4 operates | T3 and T6 which operate | 3 and 6 to effect | Registration of Digit 4. |
| 5 operates | T4 and T6 which operate | 4 and 6 to effect | Registration of Digit 5. |
| 6 operates | T5 and T6 which operate | 5 and 6 to effect | Registration of Digit 6. |
| 7 operates | T3 and T7 which operate | 3 and 7 to effect | Registration of Digit 7. |
| 8 operates | T4 and T7 which operate | 4 and 7 to effecr | Registration of Digit 8. |
| 9 operates | T5 and T7 which operate | 5 and 7 to effect | Registration of Digit 9. |
| 0 operates | T6 and T7 which operate | 6 and 7 to effect | Registration of Digit 0. |
| S operates | T1 and T7 which operate | 1 and 7 which | Operate start relay (not shown). |
| TM operates | T1 and T6 which operate | 1 and 6 which | Operate start timing relay (not shown). |
| RO operates | T2 and T3 which operate | 2 and 3 which | Operate the reorder relay (not shown). |
| CG operates | T1 and T4 which operate | 1 and 4 which | Delete any calling number stored and prepare for receipt of new calling number. |
| CD operates | T1 and T3 which operate | 1 and 3 which | Delete any called number stored and prepare for receipt of new called number. |
| CL operates | T1 and T5 which operate | 1 and 5 which | Delete any class digit stored and prepare for receipt of new class digit. |

pulse generator 104 and conductors S1–S7, keyset 411 which controls transmit contacts T1–T7 in the application of pulses over sleeve coupling unit 413, sleeve conductor S, and sleeve coupling unit 206 to the receivers 1–7 in the trunks, such as 202. The above chart indicates operation effected in the register circuit 205 in response to operation of the keys in the keyset 411.

In transmitting from the toll recording trunk 202 to the toll board 400, the three circuits which are used include:

*Circuit (1)*.—Closure of one or more of the transmit contacts T8–T12 in register 205 complete a circuit from the pulse generator 104 to sleeve coupling circuit 206. The transmit contact T8, for example, closes a circuit which extends from ground (FIGURE 1) over the B-coil in its associated stage 8 of ring counter 106, its associated lead S8, cable C, leads S8 (FIGURE 2), rectifiers 251D, transmit contacts T8 of register circuit 205, and windings 231 and 230 of coil 229 in the sleeve coupling circuit 206 to ground. Closure of contacts T9 completes a circuit from the ninth stage of ring counter 106 over conductor S9 to the sleeve coupling circuit 206, etc.

*Circuit (2)*.—As noted heretofore, the pulse generator 104 generates a group of sequential pulses in a cyclic manner (FIGURE 5), each cycle being identified as a frame and each different pulse in a frame being assigned for use by a different one of the transmit contacts T1–T12. As the time for the pulse assigned to a closed transmit contact, such as T8, occurs in each frame, the pulse is extended over the described circuit of the sleeve coupling circuit 206. A stepped-down version of the pulse is induced in circuit (2) for transmission to the toll board 400, the circuit (2) extending from ground over winding 230 of coil 229, condenser 232, sleeve conductor S, jack 404, plug 407, contacts of talk key, condenser 444, winding 442 of coil 441, to ground.

*Circuit (3)*.—At the toll board 400 a pulse of increased potential is induced in coil 443 and fed to the receivers 8–12 thereat over a third circuit (3) which extends from ground (FIGURE 4) through windings 442, and 443 of coil 441, resistor 445, input conductors I8–I12 for the different receivers 8–12, a resistor, such as 420 in receiver 8, the base emitter paths, such as 418–417 for transistor 415 to −1.5 volt source.

As noted above the autotransformer action of coil 229 (FIGURE 2) in circuits (1) and (2) steps down the voltage of the pulse prior to transmission over the sleeve conductor, and the autotransformer action of coil 441 (FIGURE 4) in circuits (2) and (3) steps the voltage up prior to coupling to the receivers 8–12.

The signals thus transmitted are isolated from the normal S-wire, D.C. signalling currents by the condensers 232 and 444.

Corresponding circuits including transmit contacts T1–T7 at toll board 400 are used in transmitting signals over sleeve coupling unit 413 in the toll board 400 to sleeve coupling unit 206 and receivers R8–R12 in the trunk 202, as will be understood from the foregoing disclosure. Each of the signalling circuits used is described in more detail hereinafter.

With reference once more to the specific call being described (person-to-person, sent paid), it will be recalled that transmit contacts T8 and T12 of register 205 were closed at the time the operator inserted plug 407 in jack 403. As a result the signal circuit effects energization of lamp TM to indicate to the operator that time start must be effected, and further energizes lamp CL to indicate to the operator that class information must be provided to the register equipment by the operator. Transmit contacts T9–T11 in the register 205 were open, and accordingly lamp RO at the toll board is extinguished to indicate to the operator that she has not initiated reorder, and lamps CG and CD are extinguished to indicate to the operator that the calling and called numbers are stored in the register circuit 205.

Upon seeing the energized condition of class lamp CL, the operator momentarily depresses the non-locking class key CL to prepare the toll recording trunk 202 to receive the class digit.

As a result of the depressing of the class key CL by the operator, contacts on key CL represented by transmit contacts T1 and T5 operate, and receivers 1 and 5 in the toll recording trunk are turned on. Receivers 1 and 5 in the register circuit 205 in turn condition the class register 245 to be responsive to the class code to be received.

The class indications used in the toll recording trunk 202 in the present system for the different types of calls is as follows:

| Type of Call: | Class-Indication |
|---|---|
| Station-to-Station, Sent-Paid | 1 |
| Person-to-Person, Sent-Paid | 2 |
| Station-to-Station Collect | 3 |
| Person-to-Person Collect | 4 |
| Other Types of Calls | 5 . . . 0 |

Assuming that the operator determined verbally from the calling party that the call was to be a person-to-person sent-paid call, the operator next depresses key 2 in keyset 411 at the toll board 400 to provide registration of the person-to-person, sent-paid class indication in register 205.

As a result of the depressing of key 2, transmit contacts T3 and T5 are closed to operate receivers 3 and 5 in the toll recording trunk 202. As a result of the class digit "2" being stored in the class register 245 of register 205, transmit contacts T12 of register 205 open, and receiver 12 at the toll board turns off as described in more detail hereinafter. With receiver 12 disabled or off, class lamp CL is extinguished.

The class digit may be inserted by the operator before the call is answered.

*Answer*

As stated before, when the called party answers, the operator determines that the correct party is on the line. If, as a result of conversing with the called party, it is determined that a different class applies to the connection, the operator may again operate the class key CL to delete the class information stored in register circuit 205, and thereafter depress the appropriate numerical key to reinsert the proper class digit.

When the operator is satisfied that timing should start, timing key TM is depressed. As a result of the depressing of timing key TM, contacts on key TM represented by transmit contacts T1 and T6 operate, and receivers 1 and 6 in the toll recording trunk 202 are turned on. The outputs of receivers 1 and 6 are connected to the register circuit 205 to operate the start timing relay 248 in trunk 202 which initiates timing of the call.

As as result of operation of the start timing relay 248, transmit contacts T8 in trunk 202 open, and receiver 8 at the toll board turns off to extinguish lamp TM.

The extinguished condition of all lamps TM–CL, indicate to the operator that all the necessary operations required of the operator relative to the call have been completed. Thereupon the operator removes the jack 407 from the plug 404 to release relay 207 in the trunk 202, and contact means, represented generally by 246, open to prevent the line lamp from relighting. Thereupon the call is "on its own" without the necessity of further operator supervision. The minute counter (not shown) in the toll recording trunk 202 operates to time the conversation.

*Toll recording*

When the subscribers have completed their conversation and hang up, the talking connections are automatically broken and toll recording takes place as described hereinbefore.

*Other types of calls*

Other types of calls that require the assistance of an operator are handled similarly, the operator assistance digit "1" or "0" being dialed after the DDD access and party digits. Information from the calling party, however, will be of a different nature and the class digit will vary.

*Station-to-station, collect calls*

On a station-to-station, collect call, for example, the procedure is similar to that described, and the operator asks the called party if he will accept charges for the call. Class digit 3 is then transmitted by the operator to the trunk 202.

*Person-to-person collect calls*

On a person-to-person collect call, the procedure is similar to that described with the operator determining verbally that the desired party is on the line, and also that the party will accept charges. Class digit 4 is transmitted to the register by the operator in such calls.

*Third number calls*

On a call in which the calling party desires that the charges be made to another number in the same calling area, the procedure is similar to that described, the time start lamp TM and class lamp CL lighting as before as the operator enters the call.

When the calling party instructs the operator to charge the call to another number, the operator momentarily depresses the calling register delete key CG. Transmitting contacts, such as T1 and T4 (FIGURE 4) close, and receivers 1 and 4 in the seized trunk (FIGURE 2) turn on. As a result of the signal outputs from receivers 1 and 4 being applied to register circuit 205, the register circuit deletes the information in the calling number registers 243 and prepares the registers 243 and prepares the registers 243 to receive a new calling number. With the deletion of the calling number from the calling number registers 243, transmit contacts T10 close and receiver 10 in the toll board 400 (FIGURE 4) is turned on to light lamp CG.

Thereupon, the operator by use of the keyset 411 keys a new calling number into the calling number registers 243. Let us suppose, for example, that the number to be dialed into the register is LA 3-4179, which is, in effect, 523-4179.

When the operator depresses key 5 in keyset 411, transmit contacts T4 and T6 close, receivers 4 and 6 in trunk 202 are turned on to register digit 5 in the register circuit 205. When the operator releases key 5, transmit contacts T4 and T6 open, and, as described in more detail hereinafter, receivers 4 and 6 turn off.

When the operator depresses key 2, transmit contacts T3 and T5 close to turn on receivers 3 and 5 in trunk 202, which register digit 2 in register circuit 205. When the operator releases key 2, transmit contacts T3 and T5 open, and receivers 3 and 5 turn off.

When the operator has completed keying of the seven digits of the new calling number into the register 243, CG relay 244 restores to open transmit contacts T10, and receiver 10 at the toll board 400 turns off to extinguish lamp CG.

The operator then operates the CL key preparing the class register 245 in register circuit 205, and further operates the appropriate class key to register the class in the register 245. As the class is registered thereon, relay 246 restores and contacts T12 open to disable receiver 12 at the toll board and thereby extinguishes lamp CL. The procedure is thereafter similar to that described heretofore.

*Transferred calls*

If the operator, in handling a person-to-person call, finds that the desired calling party cannot be reached at the called phone but can be reached at a different called number, she momentarily depresses the called number delete key CD in keyset 411 which closes transmit contacts, such as T1 and T3, to operate receivers 1 and 3 in trunk 202 (FIGURE 2) to delete the called number from the called number registers 241 in register 205. As a result thereof, relay 242 operates and transmit contacts T11 (FIGURE 2) close to operate receiver 11 at the toll board 400 (FIGURE 4) to energize called number lamp CD. Relay 242 operates relay 260 over a circuit comprising contacts 259 which drops the forward connection.

The operator then keys the seven digits of the called number into the called number register 241 in register 205, the operation of the equipment being similar to that previously described. When the complete called number is in the register 241, relay 242 restores and contacts T11 open to disable receiver 11 at the toll board 400 which extinguishes the called number lamp CD. Register 205 now engages sender 315 which engages translator 316.

The operator next momentarily depresses the start key S which closes transmit contacts, such as T1 and T7, to operate the receivers 1 and 7 in the trunk 202 (FIGURE 2), which effects closure of contacts 270 and 271 and effects the closure of contacts 242A in trunk 202 to engage the sender 315 which outpulses to complete the call to the new called number. The remaining operation is similar to that already described.

*Reorder*

If the operator, in handling a call, desires to release the forward connection and try again for any reason such as the encountering of a busy line, she does not want to delete the called number. Accordingly, she momentarily depresses the reorder key RD in keyset 411 which closes transmit contacts, such as T2 and T3 at the toll board 400 to turn on receivers 2 and 3 in trunk 202. Receivers 2 and 3 apply signals to the register circuit 205 to operate reorder relay 249 which operates reorder relay 250 over a circuit including contacts 250A. Relay 250 operates relay 260 over a circuit including contacts 259, dropping the forward connection. Relay 250 closes its contacts T9 which actuates receiver 9 at toll board 400, lighting the reorder lamp RO. The operator then depresses the start button S, actuating receivers 1 and 7 in trunk 202 which controls the start sending function which opens the circuit of relay 250 and effects the closure of contacts 242A, 270, and 271 whereby the sender outpulses to set up the new connection.

If sequence control is desired a steering circuit is provided in the toll board 400 so that lamps TM–CL light one at a time, and as one light is extinguished, the next appropriate lamp lights, whereby the operator working sequence is indicated by the light sequence.

*CLR calls*

Certain of the calls which can be dialed by the calling party will reach the operator via the CLR trunks, and it may be advisable for the operator to handle such calls rather than to have the operator advise the calling subscriber that it is necessary to place the call through the direct distance dialing equipment. In extending such calls through the direct distance dialing equipment, the operator answers the CLR trunk by use of the rear cord and estabilshes connection to a recording trunk by inserting the plug, such as 407, of a front cord in the jack, such as 400, of an idle recording trunk.

The signalling circuit immediately indicates to the toll board 400 that connection has been made to a recorder trunk, such as 202, and the recording trunk signals the toll board 400 to such effect by lighting lamps TM–CL. The operator will then operate the called key CD to prepare the called registers 241 in register circuit 205, and thereafter operate the keys which represent the called number. When the operator has filled the called number register 241, relay 242 restores to open contacts T11 which disable receiver 11 to extinguish the called lamp CD. The operator then depresses the start key S which effects the establishment of the connection to the called party. Thereupon the operator momentarily depresses the key CG, and keys the calling number (which was ascertained verbally from the calling party) to the calling number register 243 in register circuit 205. As the number is completely registered, relay 244 restores contacts T10 open, reeciver 10 is turned off and calling number lamp CG is extinguished. The operator then depresses the class key CL and keys the appropriate class digit into class register 245 in register 205. As the digit is registered, relay 246 restores, contacts T12 open, receiver 12 is turned off, and the lamp CL is extinguished.

When the called party answers, the operator starts the timing by depressing the time start key TM which starts the timer 247 in register 205. Relay 248 restores, contacts T8 open, receiver 8 is turned off and the lamp TM is extinguished.

Since this call has been established through the operator's cord circuit, the cords must remain up for the duration of the call. The call will be supervised by means of the cord circuit supervisory lamp. Timing of the call will be automatic and under control of the operator and called subscriber.

*Specific description of signalling circuit components*

The specific details of and the manner in which the pulse generator 104, transmit contacts T1–T12 and receivers 1–12, and sleeve coupling units 206 and 413 operate to effect signalling over sleeve conductor S between the toll recording trunk, such as 202, and toll board 400, is now set forth in detail.

*Pulse generator*

Reference is first made to the structure of the continuous operating pulse generator 104 which is connected common to the system. As shown in FIGURE 1, the generator 104 basically comprises a driver circuit 105 and a ring counter circuit 106 which is driven thereby to provide sequence pulses in a cyclic manner, each cycle being referred to hereinafter as a frame and each frame including 12 time slots during which one or more pulses are generated.

*Driver circuit* 105

The driver circuit 105 is a conventional blocking oscillator including a transistor 107, having an emitter, base and a collector element, a voltage divider including resistor 111, 112, a capacitor 113, a transformer 114 having windings 115, 116 poled as shown in FIGURE 1, a resistor 117 and a rectifier 120.

The collector of transistor 107 is connected to a −50 volt source, the base is connected over the 220 ohms resistor 111 and 500 ohm resistor 112 to the −50 volt source, and the junction point of resistors 111 and 112 are connected over capacitor 113 and the windings 115, 116 of transformer 114 and the 500 ohm resistor 117 to ground; and the emitter is connected to a tap on winding 115 of transformer 114 and over diode 120 to ground. A "Drive" conductor connects the emitter element of transistor 107 to the ring counter 106.

In that the driver is a conventional blocking oscillator, only a brief disclosure of its operation is set forth hereat. It is first assumed that with the energization of the transistor 107 by the −50 volt supply source, transistor 107 conducts and a 50 volt source appears across the lower winding 116 and 500-ohm resistor 117. A voltage induced in the upper winding 115 by flow of the current in the lower winding 116 causes emitter-base current to flow through .1 mf. condenser 113 and the 220-ohm resistor 111 to maintain the transistor 107 conductive.

The collector current in transistor 107 increases at a rate determined by the inductance of coil 115 and the base current decreases as the condenser 113 charges. When the base current becomes too low to permit further increase of collector current, the coil voltage drops, and the transistor 107 turns off.

The decay of current in the lower winding 116 reverses the coil voltage, and the reverse voltage plus the voltage on the charged condenser 113 biases the base of transistor 107 backwards, holding the transistor off until the condenser 113 has discharged through the 5600 ohm resistor 112. Base current then starts to flow through the 220 and 5600 ohm resistors 111, 112 turning the transistor 107 back on.

Circuit constants of the driver circuit 105 are such that the driver is on for about 50 microseconds, and off for about 75 microseconds. While the transistor conducts, a square wave pulse of −50 volts is transmitted over the drive lead to the ring counter 100, and a load current in excess of half an ampere can be supplied, if required.

*Counter*

The ring counter 106 which is driven by the pulses provided by the driver or blocking oscillators 105 comprises twelve stepping stages, each of the twelve stepping stages comprising a single transistor, such as 121, a transformer, such as 127, having windings A, B, C, a pair of diodes, such as 126, 126′, and associated circuitry including a coupling capacitor 130, and divider network having resistances, such as 131, 136, for coupling the first stage to the second or successive stage.

The collectors of each of the counter transistors, such as 121, are connected over diode 126′ and winding A of transformer 127 (and parallel connected diode 126) to the Drive lead, the emitter is grounded over the B windings of the transformer 127, and the base is connected over resistor 125 to a "Bias" lead, the bias thus provided being in the order of +3 volts and of a value thereafter which tends to maintain all transistors in the off condition. The collector of each stage in the counter is connected circuitry such as condenser 130 and resistor 131 to the base of the succeeding stage, the collector of the last stage being connected to the base of the first stage to provide a "ring" arrangement.

A "high-power" lead S1 is connected to the emitter of transistor 121 and pulses are transmitted over lead S1 to the toll recording trunks, such as 202, and the toll board 400 for sending purposes. A "low-power" lead R2 is connected to the C winding of transformer 127 to provide a reference pulse of a negative polarity on conductor R2 just prior to the operation of the second stage. It is apparent therefrom that since the counter has twelve stages, there will be twelve S leads S1–S12 and twelve R leads R1–R12.

As shown in FIGURE 1, the leads S1–S12 and R1–R12 are cabled to FIGURES 2, 3 and 4, with the leads R8–R12, S1–S7 emerging in FIGURE 2 to the toll recording trunks 1–N, and leads R1–R7 and S8–S11 emerging in FIGURE 4 to the toll board equipment 400. In operation, as the square-wave voltage pulses generated by driver 105 are coupled to the Drive conductor, the counter advances from stage to stage and since the last stage of the counter is tied back to the first stage, the counter rotates continuously in a ring fashion.

The signal output of the twelve stages of the pulse generator 105 is illustrated in FIGURE 5, and as there shown a positive pulse is transmitted to each of the twelve S (signal) leads in the twelve successive time slots of a frame, and a negative pulse followed by a positive pulse is transmitted to each of hte twelve R (reference) leads in succession, the positive pulses on the S and R leads being synchronized with each other and occurring in the same time slots.

More specifically, assuming for purposes of explanation that the driver 105 is energized, and that the first counter transistor 121 in the pulse generator 104 is on, fifty volts appears across the A and B windings of transformer 127 in stage 1. The turns ratios are such that about ten volts is induced in the B winding, resulting in the voltage conditions shown in parentheses in FIGURE 1. The positive 10 volts applied to the emitter of transistor 121 by the B winding causes emitter-base current to flow through the 330-ohm resistor 125 to the bias lead for the pulse generator 104, and the resultant base current holds the first transistor 121 in the "on" condition.

Transistor 121 remains on until the driver 105 is biassed off to terminate the pulse, and thereby remove voltage from the Drive lead, which, of course, turns the first transistor 121 off. (The termination of the drive pulse occurs long before the collector current in transistor 121 has risen to the point where the transistor 121 would try to turn off by itself.)

During the period the transistor 121 is on, the condenser 130 in the collector circuit discharges, whereas the similar condensers in all the other stages remain charged at —50 volts. While the driver 105 is off, the condenser voltages remain unchanged, for the condensers in other stages cannot discharge through the collectors of the cut-off transistors nor can they discharge back to the Drive lead because of the diodes, such as 126' in the collector circuits.

When the driver 105 turns back on to initiate transmission of the next pulse over the Drive conductor, the discharge condenser 130 in the first stage recharges over a circuit including the 1500-ohm resistor 131 and the base circuit of the transistor 132 in stage 2. The resultant pulse of base current turns on the transistor 132 in the second stage. While the second stage transistor 132 is conducting. condenser 141 discharges, and as the driver 105 turns off, and then back on to initiate the next pulse, the recharging of the second stage condenser 142 turns on the third stage. Stepping proceeds in this manner through the twelfth stage, which is connected to operate the first stage, and thereby reinitiate operation of the counter.

As the driver effects continuous or ring operation of the counter 106, signals are transmitted over the B and C windings of the transformers 127, 138, etc., in the different stages to the S and R conductors connected thereto.

When stage 1 is on, for example, its B winding delivers +10 volts to the S1 and R1 leads, and its C winding delivers —7 volts to the R2 lead. These and the other waveforms which obtain on the various leads in each cycle "or frame" of the pulse generator 104 are graphically shown in FIGURE 5. With reference thereto, it will be seen that twelve impulses of —50 volts each are generated by the driver 105 in each frame, and transmitted over the Drive conductor to the ring counter 106, the duration of the pulse period being 50 ms. and the duration of the increments between pulses being 75 ms.

The ring counter 106 cycles as explained above in response to the receipt of the twelve impulses. As shown in FIGURE 5, during the period of receipt of the first impulse on the drive conductor a +10 volt impulse is coupled over conductor S1 by the first stage of the ring counter 106; a plus 10 volt impulse is coupled over conductor R1 by the first stage; and a —7 volt impulse is coupled over conductor R2.

As the second impulse is applied over the Drive conductor to the counter 106, the second stage couples a +10 volt impulse over conductor S2 and R2, and —7 volt impulse over conductor R3, etc.

Reference is made hereat to the manner in which each counter stage is operative as energized to generate a voltage in its B winding to produce a base current which flows through its associated 330-ohm resistor, such as resistor 125 and over the Bias lead and a common-connected resistor 119 (470 ohms) to ground. The voltage drop across the common resistor 119 produces a +3 volts bias for the Bias lead with the condenser 118 (10 mf.) maintaining a steady D.-C. voltage for the Bias conductor.

If a fixed bias voltage were used, the counter would not be self-starting. With self-bias, however, the bias voltage drops to zero whenever the counter is not running, and as a result transistor leakage or any electrical disturbance (such as produced by the square-wave drive voltage through stray circuit capacitances) can cause one or more counter transistors to conduct slightly, whereupon feedback through its coil windings drives the transistor toward full conduction and counting proceeds from that point.

The self-bias, also prevents "double" operation. That is, if, for example, stages 1 and 3 both happen to be on, successive driver cycles tend to step the counter to stages 2 and 4, then to stages 3 and 5, and so on. If two stages are on at once in the disclosed arrangement, however, twice as much base current flows over the bias lead, and bias voltage builds up until the transistors no longer receive sufficient base current to support double operation.

The diode, such as 126, across the A winding of each coil limits the inductive rise of voltage when the transistor turns off. That is, the current which had been flowing through the A winding and collector circulates through the A winding and diode 126 after the transistor 121 shuts off. Coil resistance is low enough that the circulating current remains at a substantial value while the counter is stepping through the other eleven stages.

With current flowing continuously, the diode 126 effectively short circuits the A winding, and the impedance (looking from the outputs into the B or C windings) will be low while a stage is off as well as while it is on.

As noted above, the loads are applied from S leads and R leads to ground. An S lead can supply loads of several amperes, whereas loads on the R leads are limited to a few hundred milliamperes.

If under unusual circumstances an excessive load is encountered on an S lead, transistor base current will not permit sufficient collector current to satisfy the load, and the transistor will turn off as soon as it turns on. Assuming that its collector condenser has discharged sufficiently during the brief interval it was on (which normally is the case), its turning off will immediately turn on the next stage. Thus a short circuit or overload will, in effect, cause the counter to skip the overloaded stage and continue running as an eleven stage counter.

Load limitation on the R leads is more complex. Assuming, for example, that stage 1 is on and that the R2 lead is loaded, the first stage C winding generates an output voltage, and the load current flows through this winding and also through the B winding of the second stage, which is off. The second stage B winding offers low impedance because of the circulating current through the diode 126 across the A winding, but the load current in the B winding is in such a direction as to oppose the current in the A winding. If the load current is sufficiently high, the circulating current in the A winding will be stopped, and the full inductance of the B winding appears in series with the load, and the load voltage abruptly drops. Furthermore, the polarity of the voltage drop across the B winding is such as to attempt to turn on stage 2 falsely, which would initiate the double operation described earlier.

In the normal application of the generator, loads are well below the limiting values described above.

*Operation of receivers 1–12*

As noted above, the S conductors S1–S12 are coupled to the transmit contacts T1–T12, the transmit contacts T8–T12 being located in the register circuits 205 of the toll trunks, (such as 202) for use in sending S signals to the receivers R1–R8 in the toll board, and the transmit contacts T1–T7 are located in the keyset 411 for use in transmitting signals from the toll board 400 to the receivers 1–7 in the register circuits 205 in the toll trunks, such as 202.

The conductors R1–R12 are coupled between the pulse generator 104 and the corresponding ones of the receivers R1–R12 to provide both a reference pulse to the associated receiver, and a "clearing" pulse for use in controlling the disablement or "turning off" of the receiver. The specific construction of the receivers R1–R12, and the operation thereof as controlled by the S, R pulses of pulse generator 104 and the transmit contacts T1–T12 is now set forth.

With reference to FIGURE 2, each receiver, such as receiver 1 (FIGURE 2) has two input circuits or conductors, such as conductors R1 and I1 (FIGURE 2) and an output circuit, such as 1.

Two transistors, such as 208 and 214 are operatively controlled by D.C. signals coupled over the two input conductors R1–I1 to jointly control a third transistor, such as 219, which in turn control the operation of an electromagnetic relay, such as 225 to further control associated equipment. Alternatively the collector of the third transistor of a receiver (such as transistor 427 in receiver 8) may be connected to directly control energization of an indicator lamp, such as TM.

Each of the receivers 1–12 are similarly constituted, and a description of one receiver, such as receiver 1, will therefore suffice.

With the grounding of both input conductors for a receiver, such as R1 and I1 for receiver 1, the receiver is bistable and will remain either in the on or off condition (and the control units connected to the output thereof will be held energized or de-energized). A positive voltage must be applied to *both* input circuits to turn on a receiver, and a negative voltage may be applied to either input circuit to turn it off. The negative pulse which is coupled to one of the input circuits in each frame or cycle keeps the receiver normally turned off in the absence of coincident energizing signals.

The positive voltage applied to both input conductors to turn on a receiver is in the order of 1.5 to 3 volts, and the negative voltage applied to either input to turn it off is about 2 to 2.5 volts (component tolerances have less effect on turn-off voltage). Input impedance is about 5000 ohms. Turn-on and turn-off times are in the order of a few microseconds.

With specific reference to receiver 1 (FIGURE 2), if both switching transistors 208 and 214 are off, transistor 219 is on and relay 225 operates. If either of the transistors 208 or 214 are on, transistor 219 is off and relay 225 is restored.

In more detail, if both transistors 208 and 214 are off, current flows over the 6.8 K. resistor 223 and the base of transistor 219 to keep transistor 219 on, and thereby operate the relay 225. If either of transistors 208 or 214 are on, current through the 6.8 K. resistor 223 flows through the collector of transistor 208 or 214 rather than through the base of transistor 219 and transistor 219 is turned off. In effect, therefore, if either transistor 208 and 214 is turned on, it shunts the input circuit of transistor 219 to turn the transistor 219 off.

To illustrate the circuit operation, it is now assumed that both input conductors R1, I1 are grounded and transistor 219 is off. The collector of transistor 219 is at approximately −50 volts which is applied through the relay winding 225, and with a 10:1 ratio between resistor 212 (which is 47000 ohms) and resistor 213 (which is 4700 ohms)—the same ratio also exists for resistors 217 and 218—the bases of transistors 208 and 214 tend to be at approximately −5 v. Since the emitters are at −1.5 v. the bases are more negative than the emitters, and transistors 208 and 214 will both receive base current through 47 K. resistors 213 and 218. As noted above, with transistors 208 and 214 conducting, the input circuit for transistor 219 is shunted, and transistor 219 remains off.

If a positive 10 volt pulse is now applied to input conductor I1, transistor 208 will be turned off, but transistor 219 remains off because transistor 214 is still on. Similarly, a positive 10 volt pulse applied only to input conductor R1 will turn off transistor 214, and transistor 219 will remain off. If, however, both positive pulses are applied to both input conductors R1, I1, both transistors 208 and 214 will be turned off, and transistor 219 will turn on to operate relay 225.

With transistor 219 conducting, the collector of transistor 219 will be at a potential of about −2.5 volts. Recalling the 10:1 ratio of resistors 212, 213, and 217, 218, if both input conductors I1, R1 are grounded, the bases of transistors 208 and 214 will then be at a potential of about −0.25 volt. The bases are thus less negative than the emitters (−1.5 volts), and transistors 208 and 214 will remain off, and transistor 219 remains on.

Furthermore, if both transistors 208 and 214 are in the "off" condition and transistor 219 is on, the collector element of 219 (and the top ends of resistors 212 and 217) are at approximately −2.5 volts potential. As a negative 7 volt pulse is now applied to input conductor I1, it will turn on transistor 208. Similarly, if transistor 214 is off, a negative 7 volt pulse applied to input conductor R1 will turn on transistor 214. The negative 7 volt pulse causes the base to tend to be at approximately −6.5 volt potential by voltage divider action whereby the base is more negative than the emitters, and the transistor conducts. In either case, the base of transistor 219 is shunted, and transistor 219 remains off.

From the preceding description, it can be seen that a positive voltage must be applied to both input conductors R1, I1 to turn off the transistors 208 and 214, and to turn on transistor 219. Such condition is referred to as the "on" condition for the receiver. A negative voltage applied to either input conductor I1, R1 will turn on the corresponding one of the switching transistors 208 and 214, and turn off transistor 219, whereby the receiver is in its "off" condition. With the inputs R1, I1 both grounded, the receiver will remain in whichever state it was left.

When control transistor 219 is on, approximately 7 ma. base current flows through the 6.8 K. resistor 223, which is sufficient to produce 75 to 150 ma. colllector current, depending on the beta of the individual transistor. Such current will produce full voltage across a relay resistance of 700 ohms or higher. When control transistor 219 is off, the relay, such as illustrated relay 225, receives about 2 ma. through the two 47 K. resistors 212 and 217, and the relay 225 must be chosen to release reliably under such conditions.

*Pulse signaling application*

As noted above, transmit contacts T1–T12 and associated sleeve coupling units 206, 413 are used to transmit S, R signals from a common pulse generator 104 over sleeve conductor S to the receivers in the toll board position and toll recording trunks. Thus, a keyset 411 including transmit contacts, such as T1–T8, is used to transmit signals received from conductors S1–S8 respectively over a sleeve coupling unit to the sleeve conductor S and the receivers R1–R8 at the toll trunk, such as 202. In a similar manner, the toll trunk 202 includes transmitter contacts T8–T12 for transmitting signals from conductors S8–S12 over a sleeve coupling unit 206 to sleeve conductor S and receivers R8–R12 at the toll board 400 in the form of pulses which are identified by their relative time positions in the frames generated by the pulse generator 104, it being recalled that each pulse is about 50 microseconds long, and the space between successive pulses is about 75 microseconds, so that one "frame" of twelve pulses occupies about 1.5 milliseconds.

With reference to FIGURE 2, the set of five transmit contacts T8–T12 there shown are connected over diodes 251 A–E to the pulse conductors S8–S12, each of the contacts T8–T12 being controlled by relays, such as 242, 244, etc., associated with the registers 241, 243, etc., in register circuit 205. Contact T8, for example, is closed by relay 248 whenever the timer 247 is operated, contact T9 is closed by relay 250 whenever reorder has been initiated by the operator, contacts T10 are closed by relay 244 whenever further digits are to be recorded in the calling register 243, contacts T11 are closed by relay 242 whenever further digits are to be recorded in the called register 241, and contacts T12 are closed by relay 246 whenever a class digit is to be registered in class register 245.

In a similar manner, with reference to FIGURE 4, a set of seven transmit contacts T1–T7 are shown connected over diodes 450 A–G to conductors S1–S7 and the pulse generator 104, the illustrated contacts being illustrative of other parallel connected contacts represented by the multiple signs, and being on or controlled by keys 1–0, S, TM, RO, CG, CD, and CL of keyset 411.

Briefly, if transmit contact T1 is closed, the pulse on conductor S1 is transmitted; if contact T2 is closed the pulse on conductor S2 is transmitted; if contacts 1 and 2 are both closed, pulses on both conductors S1 and S2 are transmitted, etc. It will be seen that diodes 450 A–G prevent "back-up" between the selected S leads when two or more contacts of the set T1–T7 are closed concurrently.

Each receiver, such as R1–R12, is assigned a time position in the system by connecting its second input conductor to one of the twelve R or reference leads of the pulse generator 104. The second input conductor of the first receiver R1 (FIGURE 2) for example is connected to the R lead, and as shown in FIGURE 5 a positive pulse is coupled thereover during the first time slot in each frame. If, simultaneously, a pulse is transmitted over the sleeve conductor S to the second input conductor I1 for receiver 1 by reason of the operation of transmit contacts T1 at the toll board, the two coincident pulses will turn off switching transistors 208, 214, simultaneously, and transistor 221 will turn on as noted above to place the receiver in the "on" condition, and thereby effect the operation of relay 225 in register circuit 205.

If either input conductor I1 or R1 for receiver 1 receives a positive pulse at any other time in the frame, however, it will not turn on, for a positive voltage must appear on both input conductors I1, R1 simultaneously to activate the receiver to the "on" position.

When the receiver is turned on in response to the coincidence of the coupling of positive pulses to its two input circuits in the same time period in a frame, the receiver remains on until the later appearance of the negative pulse on the R1 lead, which turns it off. Assuming an S1 signal is still connected to the sleeve after termination of the negative pulse, the receiver will immediately turn back on. Looking at the waveforms on the drawing of FIGURE 5, with an S1 signal connected to the sleeve the receiver will turn on at time position 1, turn off at position 12, turn back on at position 1, and so on, thereby keeping the relay, such as 225 (or lamp), energized eleven-twelfths of each frame period. The relay 225 therefore remains in the operated position, or if an incandescent lamp, such as lamp TM, is being operated, the lamp remains lit. When the S1 signal is removed from the sleeve, the receiver is turned off by the next negative pulse which appears on the R1 lead, and the relay releases (or the lamp is extinguished).

*Sleeve coupling unit*

As noted above, the time division signals selected by the transmit contacts T1–T7 and T8–T12 are coupled to the sleeve wire S in the system by sleeve coupling units 206, 413 at the toll trunk and toll board respectively. The sleeve coupling unit 206 at the toll trunk 202 in FIGURE 2, for example, comprises the condenser 227, rectifier 228, resistor 237, coil 239 including windings 230, 231, an input circuit connected to transmit contacts T1–T7, an output circuit including coupling condenser 232 connected to sleeve conductor S, and an output circuit connected over conductors I1–I7 to receivers 1–7.

The sleeve coupling unit 413 at the toll board (FIGURE 4) comprises a condenser 439, rectified 440, coil 441, including windings 442, 443, resistor 445, and input circuit connected to transmit contacts T1–T7, a first output circuit connected over coupling capacitor 444 and contacts on the talk key and the operating position to the sleeve conductor S, and a second output circuit connected over conductors I8–I12 to receivers 8–12. It is apparent therefore that the sleeve conductor S extends between the two sleeve coupling units 206 and 413, which in turn extend to the transmitter and receiver units at their associated positions in the system.

In operation, the pulse signals coupled to sleeve coupling unit 206 by transmit contacts T8–T12 for transmission over sleeve conductor S to sleeve coupling unit 413 are stepped down in voltage by the autotransformer action of the coil 229 (FIGURE 2) in unit 206, and the coil 441 (FIGURE 4) in the sleeve coupling unit 413 steps the signal back up for coupling to the receivers 8–12. A similar action occurs when the signals are transmitted by transmit contacts T1–T8 over sleeve coupling unit 413 and sleeve S to sleeve coupling unit 206 and receivers 1–7. Reduced voltage signals are used on the sleeve wire to reduce the likelihood of the pulses producing audible noise in adjacent talking wires, and further to improve pulse transmission by reducing the losses in the rather low resistance supervisory lamps which are connected to the sleeve conductors.

The diode 228 in the sleeve coupling units 206 operates with the coil 229 (and diode 440 operates with the coil 441) as a "D.-C. restorer." During each positive pulse which is applied to the circuit, current builds up through the coil inductance, and during the space between pulses, such current circulates through the diode, such as 228, and the conducting diode effectively grounds the "signal" lead. With the same action occurring at both ends of the circuit, any charge which has built up on the 2 mf. condensers 227 (or 439) is able to dissipate during the space between pulses.

When a pulse arrives over the sleeve, the coil leakage inductance, 100-ohm resistor 237 (or 445), and .02 mf. condenser 227 (or 439) delays the appearance of the pulse at the receivers for a few microseconds. This delay reduces the likelihood of a receiver being turned on by short voltage spikes which might be picked up from other wires in the cable.

It is believed that the foregoing description clearly sets forth the manner in which a continuously running generator is operative to provide operating and reference pulses on a time division basis, and the manner in which the transmit contacts T1–T12 and receivers R1–R12 are operative to effect signal transmission and control functions with such pulses.

As a further example, however, a brief reference is made to the manner in which signals are transmitted between the trunk and toll board for a specific call, such as a person-to-person, sent-paid call of the type described hereinbefore. It will be recalled that in such call, the calling party dialed the direct distance dialing digit 8, a party identification digit 2, an operator assist code 1, and the called number comprising seven or ten digits. As a result thereof, the toll recording trunk, such as 202, was seized and the party identification digit was stored in the party register 254. The identifier 317 then translated the line number into a station number which was stored in the calling number register 243. As the complete called number was stored in the called register 241, the register circuit 205 signaled the operator by effecting energization of the call lamp 405 at each of the operator's positions. The operator at one of the positions then answered the call, and established a talking connection with the calling party by inserting the plug 407 into jack 404. At this time, it was noted that the system effected the transmission of information pertaining to the call to the operator's position. Such operation is now specifically described.

It will also be recalled that the pulse generator 104 is continually operating to couple pulses to the conductors S1–S12 and R1–R12 in the sequence and pattern shown in FIGURE 5, and that each transmitter-receiver combination in the system, such as transmit contacts T1 and receiver 1, are in effect assigned a time slot or position in each frame. Transmit contacts T1 and receiver 1, for example, are connected to conductors S1, R1 respectively, and as a result thereof, are assigned the first time slot of each frame. As shown in FIGURE 5 a negative reset pulse is coupled to conductor R1 in the time slot immediately preceding the first slot (slot 12 in the present example), and a positive pulse is coupled over conductor R1 during the first time slot of each frame. At such times as operation of receiver 1 is to be enabled, transmit contacts T1 are closed, and the positive pulse which appears on conductor S1 during the first time slot is transmitted over the system to the receiver 1 which is energized whenever an operating S pulse and a reference pulse R are applied thereto in a coincident time slot (slot 1 in the present example) as described in detail hereinbefore.

In the present exemplary call, at the time the operator inserted plug 407 into jack 403 to "work" the call, the transmit contacts T8 and T12 were in the closed position, and accordingly receivers 8 and 12 at the toll board were enabled to energize lamp TM to indicate to the operator that time start must be effected, and lamp CL is energized to indicate to the operator that class information must be provided. Transmit contacts T9–T11 at the register 205 were open, and as a result, lamp RO was extinguished to indicate to the operator that she had not initiated reorder, and lamps CG and CD were extinguished to indicate to the operator that the calling and called numbers were stored in the register circuit 205. The manner in which the information is supplied from the register circuit 205 to the toll board 400 as the operator inserts the plug 407 to work the call is now described in detail.

As the operator connects the toll board equipment to the tip, ring, and sleeve conductors T, R, S, by inserting plug 407 into jack 403, the circuits (1), (2), (3) described hereinbefore are completed from the transmit contacts in the register circuit 205 to the toll board receivers R8–R12. Since transmit contacts T8, T12 are closed, a pulse is transmitted over the sleeve conductor S during the eighth and twelfth time slots of each frame, and receivers 8 and 12 at the toll board 400 are enabled. The circuit for receiver 8, for example, extends from pulse generator 104, over conductor S8, diode 251D, transmit contacts T8 and windings 230 and 231 of coil 229 to ground. By autotransformer action, a pulse of reduced potential is transmitted over capacitor 232, and sleeve conductor S to the toll board 400, and over the contacts of the talk key, capacitor 444 and winding 442 of coil 441 to ground. By autotransformer action, a pulse of increased potential is induced in winding 443 of coil 441 which is coupled over resistor 445 to the input circuits I8–I12 for receivers 8–12.

It will be recalled that with transmission of a pulse over an S lead, such as S8, the pulse generator 104 is also operative to simultaneously transmit a reference pulse over a corresponding reference conductor R, which in the present example is conductor R8. In that only receiver R8 is connected to reference conductor R8, the S pulse received at the toll board and applied to the input conductors I8–I12 for receivers 8–12 will only be effective in receiver 8.

As described hereinbefore, with the application of a positive operating pulse to both input conductors of a receiver (I8 and R8 in the present example), transistors 415 and 421 in receiver 8 are turned off, and transistor 427 operates to effect energization of its associated indicator lamp TM on the toll board 400. Further, the receiver 8 remains in such condition until contacts T8 are opened and a negative pulse is coupled to one of the two input conductors I8, R8. As explained above, during the seventh time slot of each frame a negative pulse is coupled to reference conductor R8 and the receiver 8 is momentarily de-energized. However, in the eighth time slot a positive pulse is applied to the receiver (if the TR8 contacts are still closed) and receiver 8 is returned to the enabled or "on" condition. Since the "off" time of the receiver is in effect not detected by an energized relay or lamp, the indicator lamp TM is maintained operated during the entire period that contacts T8 in the register circuit 205 are closed.

In a similar manner closed transmit contacts T12 effect transmission of a pulse to the receiver 12 in the toll board during the twelfth time slot of each frame, and indicator lamp CL is maintained energized thereby. In that transmit contacts T9, T10, T11 are open, lamps RO, CG and CD are not energized.

In the present exemplary call (person-to-person, "sent-paid") as the call lamp CL is energized to indicate that class information must be provided, the operator momentarily depresses the non-locking class key CL to close contacts T1 and T5, and thereby operate receivers 1 and 5 in the toll recording trunk, the receivers 1 and 5 being maintained operated for the period that the transmit contacts T1 and T5 are closed to apply the first and fifth pulses of each frame over sleeve coupling unit 413, the sleeve conductor S, and sleeve coupling unit 229 in the trunk to the receivers 1 and 5.

Operation of receivers 1, 5 effects operation of corresponding relays, such as 225, to control contacts in the fan 239 to operate the class digit deletion circuit which in turn prepares the class register 245 for the receipt of a new class digit.

In that a person-to-person, sent-paid call is identified by digit 2 in the present system, the operator now presses key 2 in the keyset 411, which closes contacts T3, T5, and a pulse is transmitted over contacts T3, T5 during the third and fifth time slot of each frame to the sleeve coupling unit 413 in the toll board and over sleeve conductor S to the sleeve coupling unit 229 in the toll recording trunk and the receivers thereat. Receivers 3 and 5 operate in the manner described hereinabove to store digit 2 in the class register 245.

As a result of the class digit 2 being stored in the class register 245 of register 205, relay 246 releases and transmit contacts T12 open to interrupt the transmission circuit from conductor S12 in the pulse generator 104 to receiver 12 at the toll board 400. As the negative pulse in the eleventh time slot in the next frame is applied to conductor R12, the receiver 12 is turned off and class lamp CL is extinguished. From this point the call proceeds as described hereinbefore.

It should be understood that the techniques described herein are applicable to other telephony situations as also to situations outside the field of telephony, in which the ability to transmit a plurality of signals over a single path is desirable.

While only a particular embodiment of the invention has been disclosed and claimed, it is apparent that modifications and alterations may be made therein, and it is intended that the appended claims cover all such modifications and alterations as may fall within the true spirit and scope of the invention.

What is claimed is:

1. In an automatic telephone system having toll ticketing equipment for recording billing information relative to connections established thereover including toll trunks for establishing toll calls, and a toll board including an operators position having at least one cord circuit for use in establishing toll calls including special toll calls, register means in at least one of said trunks operative to register information pertaining to the call for billing purposes, timer means for automatically timing toll calls other than said special toll calls, signalling means including means in said one trunk for signalling said toll board for operator assistance in response to establishment of a special toll call to said trunk, and means at said operators position for transmitting signals over said cord circuit to said trunk to initiate operation of said timer means in said special calls.

2. An automatic telephone system as set forth in claim 1 in which said signalling means includes means for transmitting signals to said operators position over said cord circuit to indicate the start of timing, and means at said toll board operative to provide a visual indication of the start of timing of the special call in response to receipt of said signals.

3. A system as set forth in claim 1 in which said operators position further includes means for determining the calling party number in at least certain of said special calls, and said signalling means include means for transmitting the calling party number in said certain calls over said cord circuit to said trunk register means, means in said trunk operative to generate signals for transmission to said toll board over said cord circuit responsive to the complete registration of the calling number thereat, and means at said toll board operative responsive to said signals to provide an indication to the operators position of the complete registration of the calling number.

4. A system as set forth in claim 1 in which said signalling means includes means at said operators positions for transmitting a called party number in a special call over said cord circuit to said trunk register means, means operative to provide signals for transmission to said toll board over said cord circuit responsive to complete registration of the called number received thereat from said operators position, and indicator means at said operators position operative responsive to receipt of said signals to indicate to the operator the complete registration of the called number.

5. In an automatic telephone system having toll ticketing equipment for recording billing information relative to connections established thereover including toll trunks for establishing toll calls, and a toll board including an operators position having a cord circuit including tip, ring and sleeve conductors for use in establishing toll calls including special toll calls, register means in at least one of said trunks including at least one of said trunks including at least one register operative to register information including the number of at least one of the parties in a connection, means in said trunk operative to transmit a signal to said operator position for assistance in establishing said special calls, and signalling means including a first means in said register means for deleting at least certain of said information stored on said one register means, selection means at said toll board for transmitting an operating signal over the sleeve conductor of said cord circuit to said first means in said register means, detector means connected to said one register operative to provide a signal for transmission to said toll board responsive to deletion of said information from said register means, indicator means at said operators position operative responsive to receipt of said signals to indicate deletion of said information from said one register, and means at said toll board for transmitting a new set of digit representing signals over said sleeve conductor of cord circuit to said one register means in lieu of the information deleted therefrom.

6. A system as set forth in claim 5 in which said detector means includes means operative responsive to registration of a complete set of information on said one register means to terminate its signal transmission to said toll board.

7. In an automatic telephone system having toll ticketing equipment for recording billing information relative to connections established thereover including toll trunks for establishing toll calls, and a toll board including an operators position for use in establishing special classes of toll calls, register means in at least one of said trunks operative to register information for billing purposes including a first means for registering the identity of the parties in toll calls established thereover, means in said one trunk operative to signal the operator for assistance in establishing said special toll calls, class registration means at said toll board for providing signals for transmission to said one trunk which identify the class of the special call, class register means in said register means including means controlled by said signals to register the class of call for billing purposes, and means in said one trunk controlled by said class register responsive to complete registration of the class of call to transmit an indicating signal to said toll board.

8. A system as set forth in claim 7 in which said special calls include person-to-person and collect calls, and in which said class registration means at said toll board includes means for providing different signals for transmission to said one trunk to represent different classes in said trunk class register.

9. In an automatic telephone system having toll ticketing equipment for recording billing information relative to connections established thereover including toll trunks for establishing toll calls, and a toll board including an operators position and cord means including tip, ring and sleeve conductors for use in establishing special ones of said toll calls, call extension means for extending a connection from at least one of said trunks to associated switching equipment for extension to the desired subscriber, register means in said one trunk including at least one register operative to automatically register information pertaining to each toll call extended thereover, means operative to signal the operator position for assistance in establishing said special calls, and signalling means including reorder means at the operator position for transmitting signals over the sleeve conductor to control said call extension means to release the connection outgoing from said trunk, means in said register means for transmitting a signal over said sleeve conductor to said toll board as said connection is released, and indicator means at said toll board for indicating release of the connection.

10. A system as set forth in claim 9 in which said register means includes a register operative to register the called party number, and deletion means for removing the called party number therefrom, and in which said signalling means includes selection means at said toll board for transmitting signals to operate said detector means in the removal of the called party number from said one register, and means for transmitting signals to control said one register means thereafter to register a called party number transmitted to one register.

11. In an automatic telephone system having toll ticketing equipment for recording billing information relative to connections established thereover including a first means having toll trunks for establishing toll calls, and a second means comprising a toll board including an operator's position for use in establishing at least certain of said toll calls, signalling means including path means extending between at least one of said toll trunks and said toll board, a plurality of transmitter means at one of said first and second means, each of which is operative to transmit signals over said path means in at least one direction in a given time slot in a time-divided cycle, different transmitters being operative to transmit in different time slots, a plurality of switching devices for use in establishing toll calls over the system, a plurality of receiver means at the other of said first and second means, each of which includes means operative to enable a different one of said switching devices, means for assigning different time slots in each cycle to different ones of the receivers, said means in each of said receiver means including means for effecting the operation of the one of the switching means associated therewith only in response to the transmission of a signal over said path means during its assigned time slot in a cycle.

12. A system as set forth in claim 11 in which said means in said receiver means comprise a switching circuit including a first and second input circuit and an output circuit, a first semiconductor switching member having a control element for operating same between a first and second condition connected to said first input circuit, a second semiconductor switching member having a control circuit for operating same between a first and second condition connected to said second input circuit, means connecting at least one of said two input circuits to said path means, a third semiconductor member including its output connected to said output circuit, bias means for controlling said first and second semiconductor switching member to operate to said first condition in response to coupling of a pulse simultaneously to said first and second input circuits, and means connecting said first and second semiconductor members to a control element of said third semiconductor member for operating said third semiconductor to said second condition in response to operation of said first and second switching members to said first condition, and means for maintaining said switching members in each condition as operated thereto.

13. A switching circuit as set forth in claim 12 in which one of said first and second switching members is operated to the second condition responsive to application of a release signal to one of said input conductors, and said third switching member is restored responsive to said operation of said one switching member to said second condition.

14. In an automatic telephone system having toll ticketing equipment for recording billing information relative to connections established thereover including toll trunks for establishing toll calls, and a toll board including an operator's position for use in establishing at least certain of said toll calls, signalling means including path means extending between at least one of said toll trunks and said toll board, a plurality of transmitter means at said toll board, each of which is selectively operative to transmit signals over said path means in at least one direction in a given time slot in a time-divided cycle, different transmitter means being operative to transmit signals in different time slots, a plurality of switching means for use in establishing toll calls over said system, a plurality of receiver means in at least one of said trunks including means in each of said receiver means operative to control a different one of said switching means, means for assigning different time slots in each cycle to different ones of the receiver means, said means in each of said receiver means including means for operating the associated one of said switching means only in response to receipt of a signal transmitted over said path by one of said transmitter means at the toll board during the time slot assigned to the receiver means.

15. A system as set forth in claim 14 which includes a cord circuit including at least a sleeve conductor and in which said path means includes said sleeve conductor, and said transmitter means includes a plurality of transmitting contacts, each of which is connected to provide a signal at a different time slot in said cycle, and key means at the operator's position, each of which is connected to control at least one of said contacts to connect its signal to said sleeve conductor.

16. In an automatic telephone system having toll ticketing equipment for recording billing information relative to connections established thereover including toll trunks for establishing toll calls, and a toll board including an operator's position for use in establishing at least certain of said toll calls, signalling means including path means extending between at least one of said toll trunks and said toll board, a plurality of transmitter means in at least one of said trunks, each of which is operative to transmit signals over said path means in at least one direction at a different time slot in a given time-divided cycle, a plurality of indicating means at said operator's position, a plurality of receiver means at said toll board, each of which is operative as energized to control a different one of said indicating means at the operator's position, means for assigning different time slots in each cycle to different ones of the receivers, and means in each of said receiver means for operating the indicating means only in response to the transmission of a signal by one of said transmitter means over said path to said toll board during the time slot assigned to the receiver means.

17. In an automatic telephone system having toll ticketing equipment for recording billing information relative to connections established thereover including toll trunks for establishing toll calls, a toll board including an operator's position for use in establishing at least certain of said toll calls, signalling means including at least one conductor extending between at least one of said toll trunks and said toll board, a plurality of transmitter means, different ones of which provide a signal which occurs at a different time slot in a given cycle, a first coupling means for coupling the output of said transmitter means to said one conductor, a plurality of switching devices for use in establishing toll calls over the system, a plurality of receiver means, each of which includes means for operating a different one of said switching devices, a second coupling means for coupling said receiver means to said one conductor, and means in each receiver means for controlling each different receiver means to operate in response to the receipt of a signal in a different one of the time slots of the cycle.

18. A system as set forth in claim 17 in which said first coupling means includes means for reducing the value of the signal prior to coupling to said path means, and said second coupling means includes means for restoring the value of the signal prior to coupling thereof to the receiver means at said second means.

19. In an automatic telephone system having toll ticketing equipment for recording billing information relative to connections established thereover including toll trunks for establishing toll calls, and a toll board including an operator's position having a cord circuit including tip, ring and sleeve conductors for use in establishing at least certain of said toll calls, signalling means including path means extending between at least one of said toll trunks and said toll board, a pulse generator means operative to cyclically generate a plurality of pulses, each of which occurs in a different time slot in the cycle, a plurality of transmitter means, each of which is connected to said pulse generator means to select a different one of said timed pulses in each cycle as operated, a first coupling means for coupling the output of the operated ones of the transmitter means to said path means, a plurality of receiver means, a plurality of switching devices connected for use in the establishment of toll calls over said system, each of which includes means operative to control a different one of said switching devices, a second coupling means for coupling said receiver means to said path, and means for controlling each different one of said receiver means to operate in response to the receipt of a signal in a different one of the time slots of the cycle.

20. In an automatic telephone system, signalling means including path means extending between at least a first means including a toll trunk and a second means comprising a toll board including an operator's position, pulse generator means operative to cyclically generate a plurality of pulses, each of which pulses occurs in a different time slot in the cycle, a plurality of transmitter means associated with one of said first and second means, each of which is connected to said pulse generator means to operatively select a different one of said timed pulses in each cycle, a first coupling means for coupling the selected pulses of the operated ones of the transmitter means to said path means, a plurality of switching devices, a plurality of receiver means associated with the other of said first and second means, each of which is operative to control the operation of a different one of said switching devices, a second coupling means for coupling each of said receiver means to said path, and control means in each receiver means for effecting its assigned switching device including detection means operative only in response to the receipt of a signal in a preassigned one of the time slots of the cycle, said detection means in different receivers being operative in response to signals received in different ones of said time slots.

21. A system as set forth in claim 20 in which said control means in a receiver includes a first switching means connected to detect pulses on said path means, a second switching means connected to said pulse generator means to detect the generation of a pulse in a preassigned one of said time slots, and a third switching means connected for operation by said first and second switching means only responsive to detection of a pulse by said first and second means in the same time slot.

22. A system as set forth in claim 21 in which each of said switching means is operative between two positions, and includes bias means operative to maintain each of said switching means in a position as operated thereto.

23. In an automatic telephone system signalling means including path means extending between at least a first means including a tall trunk and second means including a tall trunk having an operator's position, a pulse generator means operative to cyclically generate a plurality of pulses, each of which pulses occurs in a different time slot in the cycle, a plurality of transmitter means associated with one of said first and second means, each of which is connected to said pulse generator means to operatively select a different one of said timed pulses in each cycle, a first coupling means for coupling the selected pulses of the operated ones of the transmitter means to said path means, a plurality of receiver means associated with the other of said first and second means, a plurality of switching devices, means in each of said receiver means operative between a first and a second position to enable and disable an associated one of said switching devices, a second coupling means for coupling each of said receiver means to said path, and control means in each receiver means operative to effect operation of said receiver means from said first position to said second position only in response to the occurrence of a signal on said path in a preassigned one of the time slots of the cycle, different receiver means being operative in response to the occurrence of signals in different ones of said time slots, and means in said receiver means for maintaining the receiver means in each condition subsequent to termination of said signal.

24. In an automatic telephone system, signalling means including path means extending between at least a first means including a tall trunk and second means including a toll board having an operator's position, a pulse generator means operative to cyclically generate a plurality of pulses, each of which pulses occurs in a different time slot in the cycle, a plurality of transmitter means associated with one of said first and second means, different ones of which are connected to said pulse generator means to operatively select different ones of said timed pulses in each cycle for transmission over said path means, a plurality of switching devices, a plurality of receiver means associated with the other of said first and second means, each of which is operative to control a different one of said switching devices, and control means in each receiver means including a first switching means connected to said path means, a second switching means connected to said pulse generator to receive only the pulses in a preassigned time slot, and a third switching means operated by said first and second switching means only responsive to coupling of a pulse to said first and second switching means during the same time slot.

25. An automatic telephone system as set forth in claim 24 which includes bias means for maintaining said third switching means in said operated position subsequent to termination of the coincident pulses, and in which said pulse generator means transmit a condition changing pulse to at least one of said switching means once each cycle to terminate operation of said third switching means.

26. An automatic telephone system as set forth in claim 24 in which said first, second and third switching means each have a first and a second position, and in which said first and second switching means are operated to said second position, and said third switching means is operated to said first position only responsive to the receipt of coincident pulses by said first and second switching means, and in which said pulse generator means transmits a signal to control operation of at least one of said first and second switching means to said first position once each cycle.

27. An automatic telephone system as set forth in claim 24 in which said first, second and third switching means are semiconductor switches, and which includes means for connecting said first and second semiconductor switches to turn off responsive to receipt of a pulse, and means connecting said third semiconductor switch to turn on responsive to turn-off of said first and second semiconductors switches, and in which said pulse generator means is connected to couple a pulse in at least one time slot in each cycle to at least one of said first and second switches to turn said one switch on and said third member off.

28. A system as set forth in claim 24 in which said pulse generator includes a drive lead over which spaced drive pulses are continuously received, a plurality of stages, each of which comprises a single switching member connected to said drive lead, a potential storage device in each stage, means for controlling a switching member in one of said stages to discharge its associated storage device responsive to receipt of a pulse over said drive conductor, means for maintaining said storage device discharged during the space occurring after the drive pulse, a charging circuit for charging said discharged storage device during the receipt of the succeeding drive pulse on said drive conductor, means controlled by said charging circuit during the charging period to enable the succeeding stage, and means for deriving pulses from each stage during the period of conduction of its switching member for at least one of said receiver and transmitter means.

29. In an automatic telephone system signalling means including path means extending between at least one of a first means including a toll trunk and second means including a toll board having an operator's position, a pulse generator means including a first means operative to cyclically generate a set of operating pulses, each of which pulses occurs in a different time slot in the cycle, a plurality of transmitter means associated with one of said first and second means, different ones of which are connected to said pulse generator means to operatively transmit a different one of said timed pulses over said path means in each cycle, a plurality of receiver means associated with the other of said first and second means connected to said path means, each of which is operative as enabled to effect at least one switching operation, and means in each receiver means operative to enable said receiver means to effect its switching operation only in response to the occurrence of a signal on said path means in a preassigned one of the time slots of the cycle, said means in different ones of said receiver means being operative in response to signals received in different ones of said time slots, and means in said pulse generator operative to couple a release pulse to each receiver means in a time slot preceding the preassigned one of the time slots for the receiver means to effect disabling of the receiver means for the period between the release pulse and the preassigned pulse.

30. In an automatic telephone system having toll ticketing equipment for recording billing information relative to connections established thereover including toll trunks for establishing toll calls, and a toll board including an operator's position having at least one cord circuit for use in establishing toll calls over said toll trunks including special toll calls, register means in at least one of said trunks operative to register information pertaining to the call for billing purposes, timer means for automatically timing toll calls, signalling means including path means extending between said one toll trunk and said toll board, a plurality of transmitter means at said toll board, each of which is operative to transmit signals over said path means to said trunk in a different time slot in a time-divided cycle, means at said operator's position for controlling at least one of said transmitter means to transmit a signal to said trunk in a preassigned one of said time slots to effect operation of said timer means in said special calls, a plurality of receiver means at said toll trunk, means for assigning different time slots in each cycle to different ones of the receivers, and means in at least one of said receiver means for effecting operation of said timer means only in response to the transmission of said signal by said toll board over said path means to said trunk during said preassigned one of said time slots in the cycle.

31. An automatic telephone system as set forth in claim 30 in which said toll trunk includes a plurality of transmitters, each of which is operative to transmit a signal to said toll board in different ones of said preassigned time slots, at least one of said trunk transmitters being operative to transmit a signal in a time slot preassigned to indicate the start of operation of said timer means, indicator means at said toll board and a plurality of receiver means at said toll board, at least one of which is operative only in response to the receipt of said signal in said preassigned time slot for timer start indication to control said indicator means to notify the operator of the start of said timer means.

32. A system as set forth in claim 30 in which different groups of said transmitter means at said toll board are connected to transmit signals in different preassigned time slots to represent different digits, and which include digit transmitter means operative to control said transmitter means to transmit the signals in the time slots preassigned to represent the digits of the calling party number, means connecting predetermined ones of said receiver means at said trunk to operate responsive to receipt of said signals to represent said digits, and digit recording means controlled by said trunk receiver means to effect registration of the received digits in said register means.

33. A system as set forth in claim 30 in which said toll board includes class registration means for controlling certain ones of said toll board transmitter means to transmit signals to said one trunk in at least one time slot preassigned to indicate a class of a call, and in which said trunk means includes class register means, and means connecting at least one of said receiver means at said trunk to operate only responsive to the receipt of a signal in said class-of-call time slot to operate said class register means to register the class of call indicated.

34. In an automatic telephone system, a toll board including transmitter means, a toll trunk including receiver means, signalling means including path means extending between said toll board and said toll trunk in said system, a pulse generator means in said system operative to cyclically generate a plurality of pulses, each of which pulses occurs in a different time slot in the cycle, means in said pulse generator means for continuously generating spaced drive pulses, a plurality of stages, each of which comprises a single switching member connected to said drive lead, a potential storage device in each stage, means for controlling a switching member in one of said stages to discharge its associated storage device responsive to receipt of a pulse over said drive conductor, means for maintaining said storage device discharged during the space occurring after the drive pulse, a charging circuit for charging said discharged storage device during the receipt of the succeeding drive pulse on said drive conductor, means controlled by said charging circuit during the charging period to enable the succeeding stage, means for deriving pulses from each stage during the period of conduction of its switching member; means at said toll board for connecting different ones of said timed pulses over said path means to said trunk, and control means in each receiver means at said trunk including a first switching means connected to said path means, a second switching means connected to said pulse generator to receive only the pulses generated in a preassigned time slot, different ones of said receiver means being connected to receive the pulses in different slots, a switching device for use in establishing a toll call, and a third switching means for controlling said switching device operated by said first and second switching means only responsive to coupling of a pulse to said first and second switching means during the same time slot.

References Cited by the Examiner

UNITED STATES PATENTS

| | | | |
|---|---|---|---|
| 2,771,510 | 11/1956 | Ostline | 179—27 |
| 2,839,610 | 6/1958 | Broadhurst et al. | 179—18 |
| 2,848,543 | 8/1958 | Breed et al. | 179—7.1 |
| 2,860,243 | 11/1958 | Kaplan | 307—106 |
| 2,861,202 | 11/1958 | Brinster et al. | 307—106 |
| 2,889,405 | 6/1959 | Harris | 179—7.1 |
| 2,908,759 | 10/1959 | Peterson | 179—7.1 |
| 2,921,137 | 1/1960 | Morris et al. | 179—18 |
| 3,014,987 | 12/1961 | Blackhall | 179—7.1 |
| 3,015,699 | 1/1962 | Faulkner et al. | 179—18 |
| 3,020,419 | 2/1962 | Brightman | 307—88.5 |
| 3,061,685 | 10/1962 | Peach | 179—18 |
| 3,087,021 | 4/1963 | Trousdale | 179—18 |
| 3,087,022 | 4/1963 | Brightman et al. | 179—18 |

ROBERT H. ROSE, *Primary Examiner.*

WALTER L. LYNDE, *Examiner.*